United States Patent [19]

Matsumoto et al.

[11] Patent Number: 5,583,803
[45] Date of Patent: Dec. 10, 1996

[54] TWO-DIMENSIONAL ORTHOGONAL TRANSFORM PROCESSOR

[75] Inventors: Yoshifumi Matsumoto, Osaka; Masaki Toyokura, Minoo, both of Japan

[73] Assignee: Matsushita Electric Industrial Co., Ltd., Osaka, Japan

[21] Appl. No.: 364,116

[22] Filed: Dec. 27, 1994

[30] Foreign Application Priority Data

Dec. 27, 1993 [JP] Japan ..................................... 5-330106

[51] Int. Cl.$^6$ ........................................................ G06F 7/38
[52] U.S. Cl. ............................................................. 364/725
[58] Field of Search .............................................. 364/725

[56] References Cited

U.S. PATENT DOCUMENTS

| | | | |
|---|---|---|---|
| 4,791,598 | 12/1988 | Liou et al. | 364/725 |
| 5,053,985 | 10/1991 | Friedlander et al. | 364/725 |
| 5,181,183 | 1/1993 | Miyazaki | 364/725 |
| 5,191,548 | 3/1993 | Balkanski et al. | 364/725 |
| 5,359,549 | 10/1994 | Tanaka et al. | 364/725 |

FOREIGN PATENT DOCUMENTS

| | | |
|---|---|---|
| 3-35353 | 2/1991 | Japan . |
| 3-214256 | 9/1991 | Japan . |
| 4-277932 | 10/1992 | Japan . |

*Primary Examiner*—Tan V. Mai
*Attorney, Agent, or Firm*—McDermott, Will & Emery

[57] ABSTRACT

The two-dimensional DCT (discrete cosine transform) of plural n×n data items is carried out at high speed, with requiring less hardware. X(h) is an operation in which row vectors of A(h) are sequentially transmitted from a first memory to a one-dimensional DCT processor for product-of-matrices computations and the products thus found are sequentially written to at addresses of corresponding row vectors of B(h) of a second memory. Y(h) is an operation in which column vectors of B(h) are sequentially transmitted from the second memory to the one-dimensional DCT processor for product-of-matrices computations and the products thus found are sequentially written to at addresses of corresponding column vectors of C(h) of the first memory. The operation X(h) starts at h=1 and ends at h=m. Then, the operation Y(h) starts at h=1 and ends at h=m. The one-dimensional DCT processor performs the pipelining operation of n-element one-dimensional vectors for product-of-matrices computations.

10 Claims, 18 Drawing Sheets

TWO-DIMENSIONAL ORTHOGONAL TRANSFORM PROCESSOR

BACKGROUND OF THE INVENTION

This is an invention in two-dimensional orthogonal transform for signal processing.

Of various digital signal processing methods for information compression a transform coding technique has been considered important. For example, a system capable of performing the transform-coding of image information comprises the following components: a blocking unit for dividing a target picture into blocks each made up of n×n picture elements; an orthogonal transform processor for performing the two-dimensional orthogonal transform of each block; a quantizer for quantizing a result found by the orthogonal transform processor (i.e., a set of transform coefficients); and an encoder for performing the variable-length encoding of the quantized transform coefficients. The orthogonal transform includes the Hadamard transform, the slant transform, and the discrete cosine transform, abbreviated DCT. The coding standards for digital storage media request that two-dimensional DCT should be continuously performed, one block at a time, at high speed. A group of plural blocks is called a macro block, and a transform coding apparatus employing a pipeline architecture by macro block has been proposed.

U.S. Pat. No. 4,791,598 discloses a two-dimensional DCT processor having a pair of one-dimensional DCT processors and a transposition memory connected between these one-dimensional DCT processors. Japanese Patent Application, published under No. 3-214256; discloses a two-dimensional DCT processor identical in the above-mentioned internal configuration with the U.S. Pat. No. 4,791,598's processor. Both of these two-dimensional DCT processors are large in size because of the two one-dimensional DCT processors. This produces the problem that integrated processors require large chip area.

SUMMARY OF THE INVENTION

Accordingly, it is an object of the present invention to provide a small, high-speed two-dimensional orthogonal transform processor suitable for pipelining in macro blocks.

With a view to achieving the above-described object, the present invention was made. In the present invention, an improved sequence for generating addresses to a transposition memory is provided, whereupon two-dimensional DCT can be executed at high speed by means of a single one-dimensional DCT processor. This will be explained below in detail.

The present invention provides an improved two-dimensional orthogonal transform processor for continuously executing a series of operations, in order to find a set of two-dimensional orthogonal transform coefficients by performing the one-dimensional orthogonal transform of A(h) into B(h) and by further performing the one-dimensional orthogonal transform of said transformed B(h) into C(h), where each of said A(h), said B(h), and said C(h) (h=1, 2, . . . , m) represents a two-dimensional data group of m data items, e.g., A(1), A(2), . . . , A(m), and each of said m data items is composed of n×n elements. More specifically, this two-dimensional orthogonal transform processor comprises:

a memory in which A(h), B(h), and C(h) are stored;

a single one-dimensional orthogonal transform processor which is pipelined in such a way as to process a one-dimensional vector of n elements; and an arithmetic and control unit for controlling the memory and the one-dimensional orthogonal transform processor;

wherein:
  (i) if $X(h)_i$ represents an operation comprising the steps of:

transmitting an ith row or column vector of A(h) from the memory to the one-dimensional orthogonal transform processor for product-of-matrices computations; and writing the product thus found to at an address of a corresponding vector of an ith row or column of B(h) of the memory;

(ii) if $Y(h)_j$ represents an operation comprising the steps of:

transmitting a jth column or row vector of B(h) from the memory to the one-dimensional orthogonal transform processor for product-of-matrices computations; and writing the product thus found to at an address of a corresponding vector of a jth column or row of C(h) of the memory; and (iii) if the operations $X(h)_i$ (i=1, 2, . . . , n) are collectively called an operation X(h) and the operations $Y(h)_j$ (j=1, 2, . . . , n) are collectively called an operation Y(h);

the arithmetic and control unit controls the memory and the one-dimensional orthogonal transform processor in order that, immediately after X(h) starts with respect to every h (h=1, 2, . . . , m), either an operation X(k) or Y(k) starts with respect to k that differs from h, and Y(h) then starts.

A one-dimensional orthogonal transform will first be described. For example, a case of performing the one-dimensional orthogonal transform of a one-dimensional data vector v of n elements by means of an n×n orthogonal transform matrix T is discussed. In such a case, an ith row of the matrix T is multiplied by the data vector v, to yield an ith row element of an inner product Tv. In other words, each row of the matrix T is multiplied in sequence by the data vector v, to find an orthogonal transform coefficient vector Tv. In the case of performing the one-dimensional orthogonal transform of a two-dimensional matrix A of n×n elements by means of an n×n orthogonal transform matrix T, the same operation should be applied either to each of n row vectors of the matrix A in place of the data vector v if the transform in question is in the row direction, or to every column vector of the matrix A if the transform in question is in the column direction.

A two-dimensional orthogonal transform is described below. In terms of matrices H and K, "$H^T$" and "$(H)^T$" each mean "a transposition matrix of the matrix H", and "HK" means an inner product of H and K. To compute the two-dimensional orthogonal transform of two-dimensional n×n data (i.e., a matrix A) by an n×n orthogonal transform matrix T is to compute $TAT^T$. Since $TAT^T=(T(TA)^T)^T$ holds, this computation can be implemented by a means for computing TK with respect to the matrix K and a transposition means for matrix transposition. Such a means for computing TK can be implemented by a one-dimensional orthogonal transform processor. The transposition means can be implemented by dealing with a two-dimensional matrix by row or by column.

In accordance with the present invention, in consideration for the processing of macro blocks, two-dimensional data A(h) of m data items (i.e., A(h)=A(1), A(2), . . . , A(m)) is batch-stored in the memory. Additionally, upon completion of the input of row vectors of A(1) to the one-dimensional orthogonal transform processor, row vectors of A(2) are inputted to the one-dimensional orthogonal transform processor. After row vectors of m items of two-dimensional data A(h) (h=1, 2, ..., m) are processed in the one-dimensional orthogonal transform processor, m items of two-dimensional data B(h) (h=1, 2, ..., m) are obtained. Then, the processing of column vectors starts at B(1).

In accordance with the operation $X(h)_i$, an ith row vector of A(h), i.e., $A(h)_{y=i}$, is written to at an address of an ith row vector of B(h), i.e., $B(h)_{y=i}$. Therefore, it is possible for A(h) and B(h) to be superimposed in the same storage domain. Additionally, in accordance with the operation $Y(h)_j$, the result of the processing of a jth column vector of B(h), i.e., $B(h)_{x=j}$, is written to at an address of a jth column vector of C(h), i.e., $C(h)_{x=j}$. It is therefore possible for B(h) and C(h) to be superimposed in the same storage domain. Less storage is required.

As described above, in accordance with the present invention, both the processing of row (or column) vectors of A(h) and the processing of row (or column) vectors of B(h) are illustratively batch-performed, respectively. Therefore, the blank time in the processing is reduced, and a two-dimensional orthogonal transform processor requiring a less number of arithmetic operation cycles is realized. Furthermore, a single one-dimensional orthogonal transform processor is employed, so that integrated two-dimensional orthogonal transform processors require less chip area.

DETAILED DESCRIPTION OF THE INVENTION

Preferred embodiments of the present invention will now be described below with reference to the accompanying drawing figures.

PREFERRED EMBODIMENT 1

Figure 1:
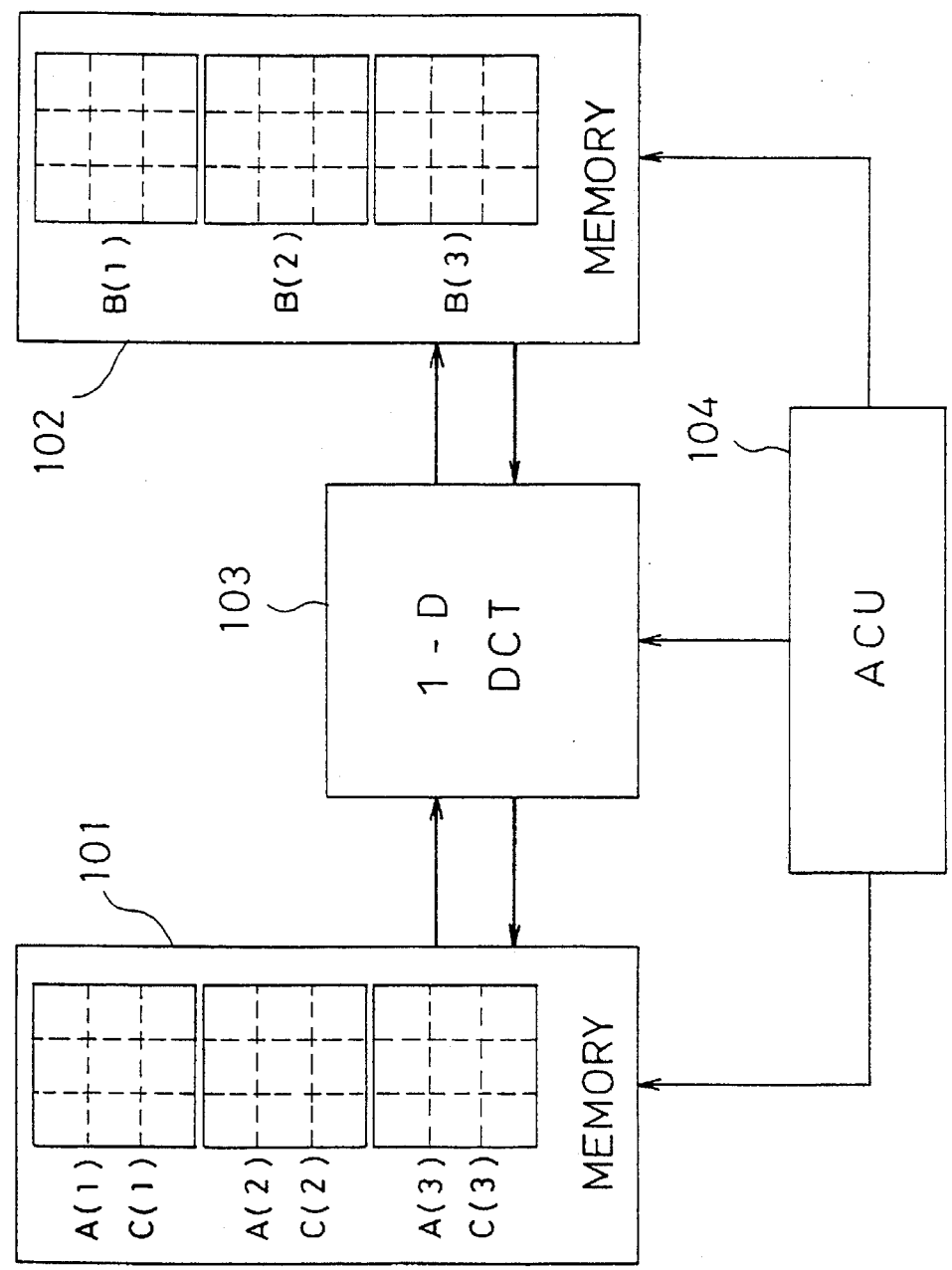
FIG. 1 is a block diagram showing a two-dimensional DCT processor of the first embodiment.

Referring now to FIG. 1, a two-dimensional DCT processor of the first preferred embodiment is described. 101 is a first memory. 102 is a second memory. 103 is a one-dimensional DCT processor. 104 is an arithmetic and control unit (ACU). The first memory 101, on the one hand, is able to collectively store or batch-store a two-dimensional data group A(h) of m data items, i.e., A(1), A(2), ..., A(m), each A(h) being composed of n×n elements. So, the first memory 101 batch-stores m blocks. C(h) is the result of the two-dimensional DCT of A(h). A(h) and C(h) are "superimposed" with each other at the same storage domain in the first memory 101. For example, A(1) and its corresponding data item, C(1), are stored at the same storage domain in the first memory 101 (see FIG. 1). The second memory 102, on the other hand, is able to batch-store a two-dimensional data group B(h) which is the result of the one-dimensional DCT of A(h). Note that A(h), B(h) and C(h) may be called the three-dimensional data A, B, and C, respectively. The one-dimensional DCT processor 103 has an n×n DCT matrix T and is capable of computing a product of matrices with respect to an incoming one-dimensional vector v of n elements. In the present embodiment, the one-dimensional DCT processor 103 is a pipelined processor, and cycle delay proportional to the number of pipeline stages occurs between input and output of data.

The ACU 104 is responsible for OPERATION X(h) and OPERATION Y(h). In OPERATION X(h), on the one hand, for i=1, 2, ..., n, an ith row vector of A(h), i.e., $A(h)_{y=i}$, is read from the first memory 101 to the one-dimensional DCT processor 103, and in response the one-dimensional DCT processor 103 multiplies the received $A(h)_{y=i}$ by $Ty_{=i}$ to yield a product of matrices, i.e., $T_{y=i}A(h)_{y=i}$, and the product thus found is written in sequence to at an address of a corresponding vector of an ith row of B(h), i.e., $B(h)_{y=i}$. In OPERATION Y(h), on the other hand, for j=1, 2, ..., n, a jth row vector of B(h), i.e., $B(h)_{x=j}$, is read From the second memory 102 to the one-dimensional DCT processor 103, and in response the one-dimensional DCT processor 103 multiplies the received $B(h)_{x=j}$ by $T_{y=j}$ to yield a product of matrices, i.e., $T_{y=j}B(h)_{x=j}$, and the produce thus found is written in sequence to at an address of a corresponding vector of a jth row of C(h), i.e., $C(h)_{x=j}$. The ACU 104 controls the first memory 101, the second memory 102, and the one-dimensional DCT processor 103 in order that the OPERATION X(h) commences at h=1 and ends at h=m (this operation is called OPERATION X) and thereafter, the OPERATION Y(h) commences at h=1 and ends at h=m (this operation is called OPERATION Y).

In the OPERATION X, $AT^T$ (i.e., a product of matrices) is stored in the second memory 102 as a matrix B. In the subsequent OPERATION Y, TB (i.e., a product of matrices) is stored in the first memory 101 as a matrix C. Here, $C=TB=T(AT^T)=TAT^T$. Therefore, with respect to the data A, its two-dimensional DCT coefficient matrix, $TAT^T$, can be computed by the two-dimensional DCT processor of FIG. 1.

Figure 2:
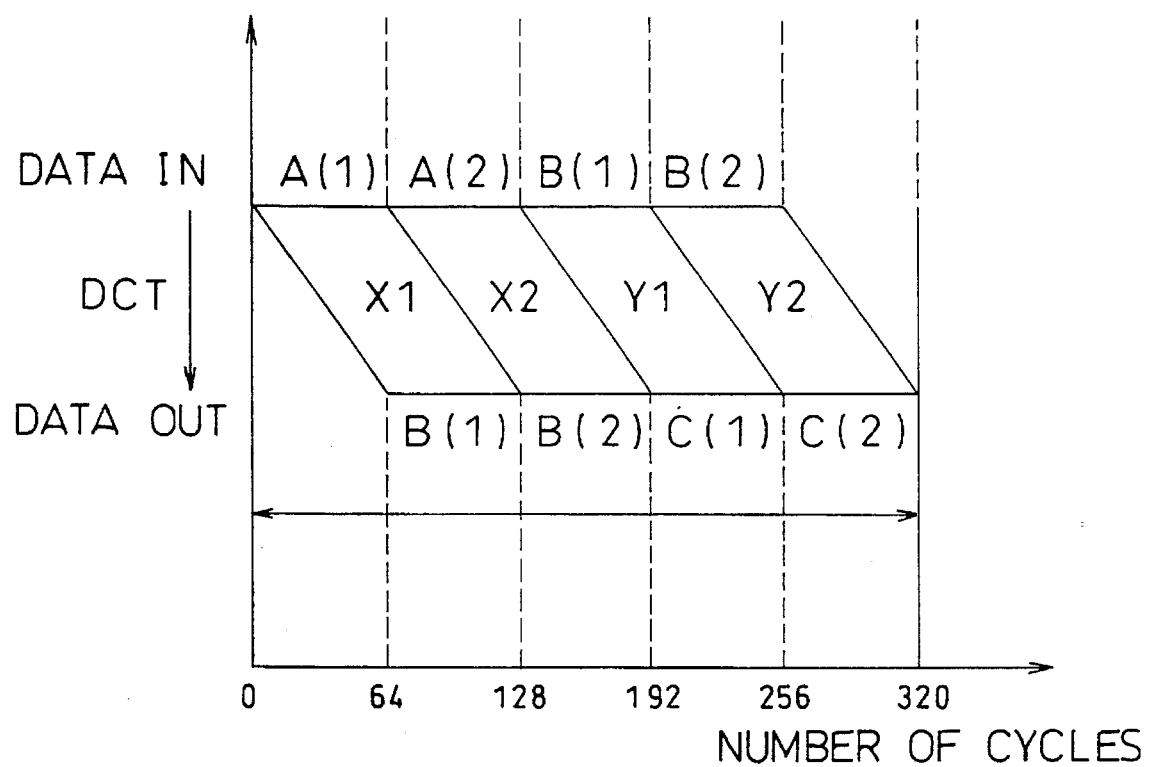
FIG. 2 is a timing chart showing the operation of the FIG. 1 two-dimensional DCT processor.

FIG. 2 is a timing chart illustrating an example of the operation of the FIG. 1 two-dimensional DCT processor. In this example, A(1) and A(2) are processed in sequence. X1 represents the one-dimensional DCT of row vectors of A(1). Y1 represents the one-dimensional DCT of column vectors of B(1) which is the result of the one-dimensional DCT of A(1). X2 represents the one-dimensional DCT of row vectors of A(2). Y2 represents the one-dimensional DCT of column vectors of B(2) which is the result of the one-dimensional DCT of A(2). Row vectors of A(1) are applied in sequence to the one-dimensional DCT processor 103. Then, row vectors of A(2) are applied in sequence to the one-dimensional DCT processor 103. These row vectors of A(1) and A(2) are subjected to respective pipeline operations (OPERATIONS X1 and X2). On completion of the input of all the row vectors of A(2) to the one-dimensional DCT processor 103, the whole B(1) is obtained by the OPERATION X1. This immediately downloads column vectors of B(1) to the one-dimensional DCT processor 103, and the OPERATION Y1 commences. On the other hand, on completion of the input of all the column vectors of B(1), the whole B(2) is obtained by the OPERATION X2. This immediately downloads column vectors of B(2) to the one-dimensional DCT processor 103, and the OPERATION Y2 commences.

Figure 3:
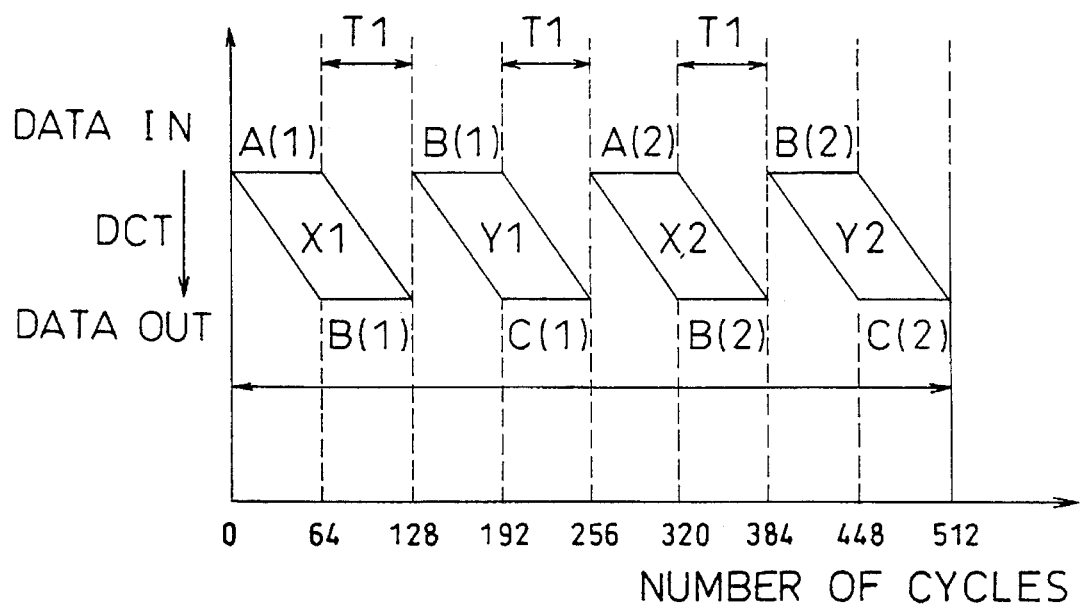
FIG. 3 is a timing chart showing the operation of a compare example of the FIG. 1 two-dimensional DCT processor.

FIG. 3 shows a compare example. In accordance with this example, row vectors of A(Z) are applied in sequence to a one-dimensional DCT processor. After the whole B(1) (i.e., the output of the one-dimensional DCT processor) is obtained by the OPERATION X1, column vectors of B(1) are applied in sequence to the one-dimensional DCT processor, to obtain C(1) by the OPERATION Y1. After the whole C(1) is obtained, row vectors of A(2) are applied in sequence to the one-dimensional DCT processor. Further, after the whole B(2) (i.e., the output of the one-dimensional DCT processor) is obtained by the OPERATION X2, column vectors of B(2) are applied in sequence to the one-dimensional DCT processor, to obtain C(2) by the OPERATION Y2. As shown in FIG. 3, a blank time T1 is created by cycle delay caused by pipelining in the operation of the one-dimensional DCT processor. B(1), which is the result of the OPERATION X1, is required in executing the OPERATION Y1. In other words, the execution of the OPERATION Y1 must wait for the OPERATION X1 to finish. Likewise, B(2), which is the result of the OPERATION X2, is required in executing the OPERATION Y2. In other words, the execution of the OPERATION Y2 must wait for the OPERATION X2 to finish. Therefore, the number of cycles required for the processing of A(1) and A(2) totals to 512.

Conversely, according to FIG. 2, the blank time T1 is cancelled, so that the number of cycles required for the processing of A(1) and A(2) is reduced down to 320. This increases the rate of the two-dimensional continuous DCT of plural blocks, in comparison with the case of FIG. 3. However, in FIGS. 2 and 3, both the time taken to write A(1) and A(2) in the first memory 101 and the time taken to read C(1) and C(2) from the first memory 101 are considered nill for the sake of simplicity.

In accordance with the present embodiment, the OPERATIONS X1, X2, X3, X4, Y1, Y2, Y3, and Y4 are executed in that order. However, a different execution order may be used. For example, X1→X2→Y1→Y2→X3→X4→Y3→Y4 may be employed.

PREFERRED EMBODIMENT 2

Figure 4:
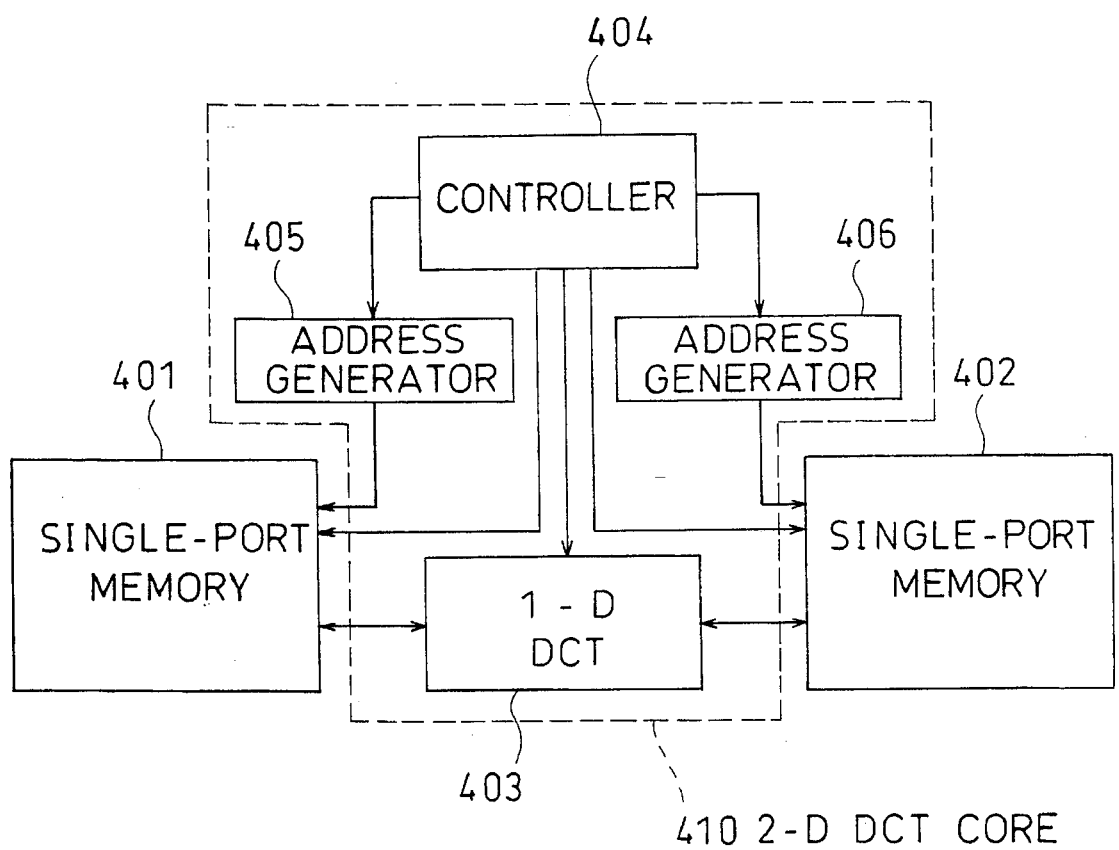
FIG. 4 is a block diagram showing a two-dimensional DCT processor of the second embodiment.

Referring to FIG. 4, a two-dimensional DCT processor of the second preferred embodiment is now described below. 401 is a first single-port memory. 402 is a second single-port memory. 403 is a one-dimensional DCT processor. 404 is a control unit. 405 is a first address generator. 406 is a second address generator. 410 is a two-dimensional DCT core made up of the one-dimensional DCT processor 403, the control unit 404, and the first and second address generators 405, 406. The first single-port memory 401 of FIG. 4 corresponds to the first memory 101, and the second single-port memory 402 to the second memory 102, and the one-dimensional DCT processor 403 to the one-dimensional DCT processor 103. The first address generator 405 has two modes, the first mode and the second mode. In the first mode, on the one hand, the first address generator 405 generates addresses in order that, for i=1, 2, . . . , n, and for h=1, 2, . . . , m, an ith row vector of A(h), i.e., $A(h)_{y=i}$, is read from the first single-port memory 401. In other words, row vectors of A(i) are read in sequence from the first single-port memory 401. Then, row vectors of A(2 to m) are read in sequence from the first single-port memory 401. In the second mode, on the other hand, the first address generator 405 generates addresses in order that, for j=1, 2, . . . , n, and for h=1, 2, . . . , m, a jth column vector of C(h), i.e., $C(h)_{x=j}$, is written to the first single-port memory 401. Like the first address generator 405, the second address generator 406 has two modes, the first and the second modes. In the first mode, on the one hand, the second address generator 406 generates addresses in order that, for i=1, 2, . . . , n, and for h=1, 2, . . . , m, an ith row vector of B(h), i.e., $B(h)_{y=i}$, is written to the second single-port memory 402. In other words, row vectors of B(1) are written in sequence to the second single-port memory 402. Then, row vectors of B(2 to m) are written in sequence to the second single-port memory 402. In the second mode, on the other hand, the second address generator 406 generates addresses in order that, for j=1, 2, . . . , n, and for h=1, 2, . . . , m, a jth column vector of B(h), i.e., $B(h)_{x=j}$, is read from the second single-port memory 402.

The control unit 404 exerts its control as follows. The control unit 404 causes the first address generator 405 to be activated in the first mode in order that, for i=1, 2, . . . , n, and for h=1, 2, . . . , m, an ith row vector $A(h)_{y=i}$ is read from the first single-port memory 401. $A(h)_{y=i}$ thus read is transmitted to the one-dimensional DCT processor 403. In response, the one-dimensional DCT processor 403 computes a product of matrices, i.e., $T_{y=i}A(h)_{y=i}$. The control unit 404 also causes the second address generator 406 to be activated in the first mode in order that the product thus found by the one-dimensional DCT processor 403 is written to at an address of a corresponding ith row vector $B(h)_{y=i}$ of the second single-port memory 402, for i=1, 2, . . . , n, and for h=1, 2, . . . , m. The control unit 404 then causes the second address generator 406 to be activated in the second mode in order that, for j=1, 2, . . . , n, and for h=1, 2, . . . , m, a jth column vector $B(h)_{x=j}$ is read from the second single-port memory 402. $B(h)_{x=j}$ thus read is transmitted to the one-dimensional DCT processor 403. In response, the one-dimensional DCT processor 403 computes a product of matrices, i.e., $T_{y=j}B(h)_{x=j}$. The control unit 404 also causes the first address generator 405 to be activated in the second mode in order that the product thus found by the one-dimensional DCT processor 403 is written to at an address of a corresponding jth column vector $C(h)_{x=j}$ of the first single-port memory 401, for j=1, 2, . . . , n, and for h=1, 2, . . . , m.

In accordance with the two-dimensional DCT processor of FIG. 4, like the first embodiment, the blank time in processing is cancelled (see FIGS. 2 and 3). This increases the rate of the two-dimensional continuous DCT of plural blocks. Additionally, the results of the one-dimensional DCT processing of the A(h)'s row vectors are the B(h)'s row vectors, and the results of the one-dimensional DCT processing of the B(h)'s column vectors are the C(h)'s column vectors. As a result of such arrangement, the first and second address generators 405, 406 may be formed using the same internal organization. However, delay proportional to the one-dimensional DCT processor's 403 pipeline delay is set between the timing of generating addresses by the first address generator 405 and the timing of generating addresses by the second address generator 406.

Figure 5:
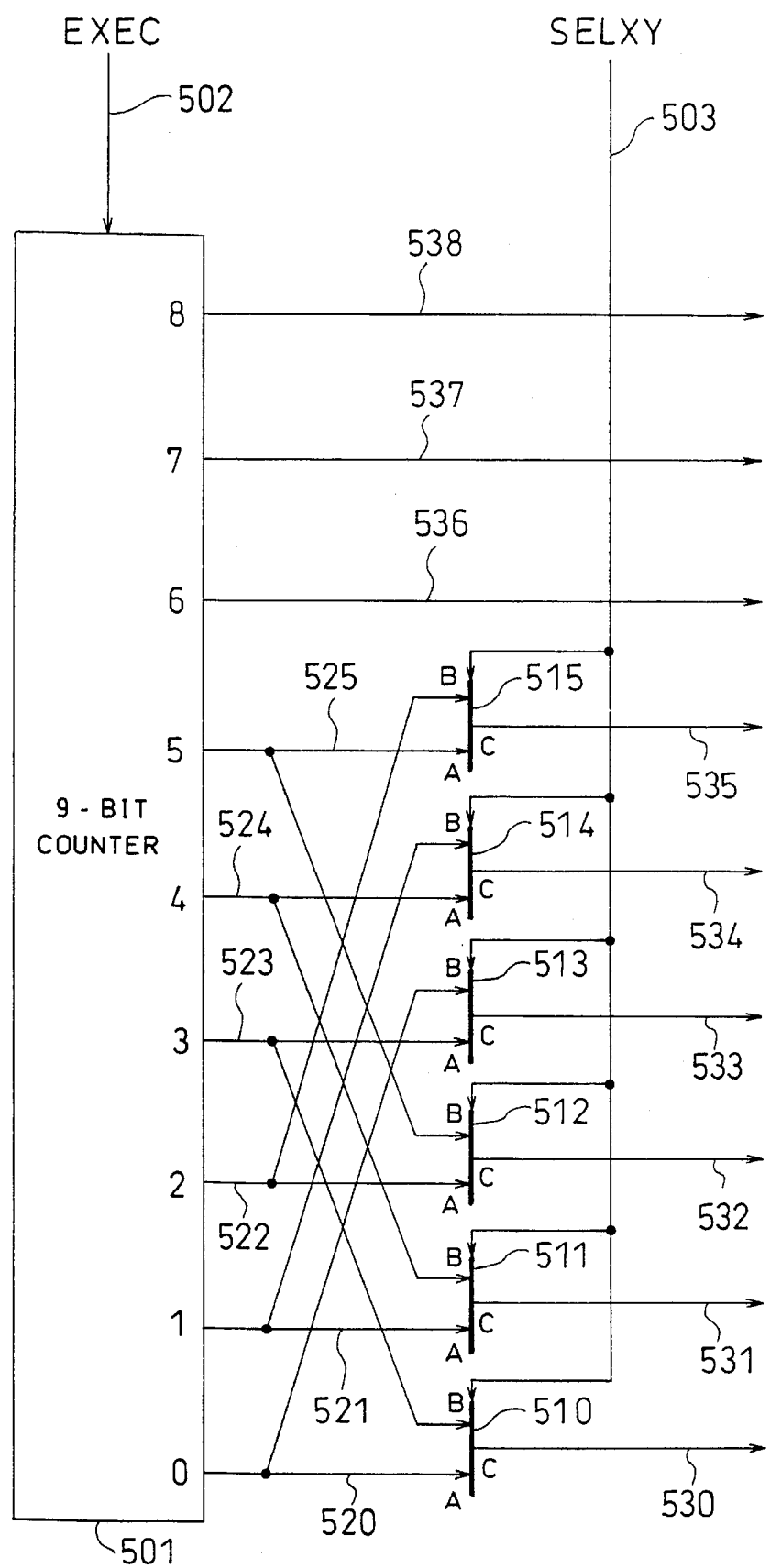
FIG. 5 is a block diagram showing an organization of each address generator as shown in FIG. 4.

FIG. 5 shows an example of the organization of the first and second address generators 405, 406 of FIG. 4. 501 is a 9-bit counter. 510–515 are selectors. 502 is a counter control signal (EXEC). 503 is a mode switch signal (SELXY). Signals 520–525, 536–538 are the bit outputs of the 9-bit counter 501. Signals 530–535 are the respective outputs of the selectors 510–515. The signals 530–538 are the outputs of the address generator. The 9-bit counter 501 is a binary counter that is controlled by the EXEC 502 and is able to repeatedly count from 0 up to 511. Each selector 510–515 has two inputs A, B and one output C and selects one of these two inputs according to a switch input. The inputs A of the selectors 510–515 are coupled to the signals 520–525, respectively. The inputs B of the selectors 510–512 are coupled to the signals 523–525, respectively. The inputs B of the selectors 513–515 are coupled to the signals 520–522, respectively. The outputs C of the selectors 510–515 are coupled to the signals 530–535, respectively. Each switch input of the selectors 510–515 is coupled to the SELXY 503.

In the address generator of FIG. 5, the 9-bit counter 501 begins counting by the EXEC 502. The 9-bit counter 501 gives an output of 9 bits. The assignment of the selectors 510–515 is changed by the SELXY 503. In the first mode, on the one hand, the six rightmost bits of the output (9 bits) of the 9-bit counter 501 are just outputted as a part of the address. In the second mode, on the other hand, the first three bits and the second three bits of the six rightmost bits are exchanged and the result is outputted as a part of the address. Meanwhile, the three leftmost bits of the 9-bit output of the 9-bit counter 501 are just outputted as a remaining part of the address.

Figure 6:
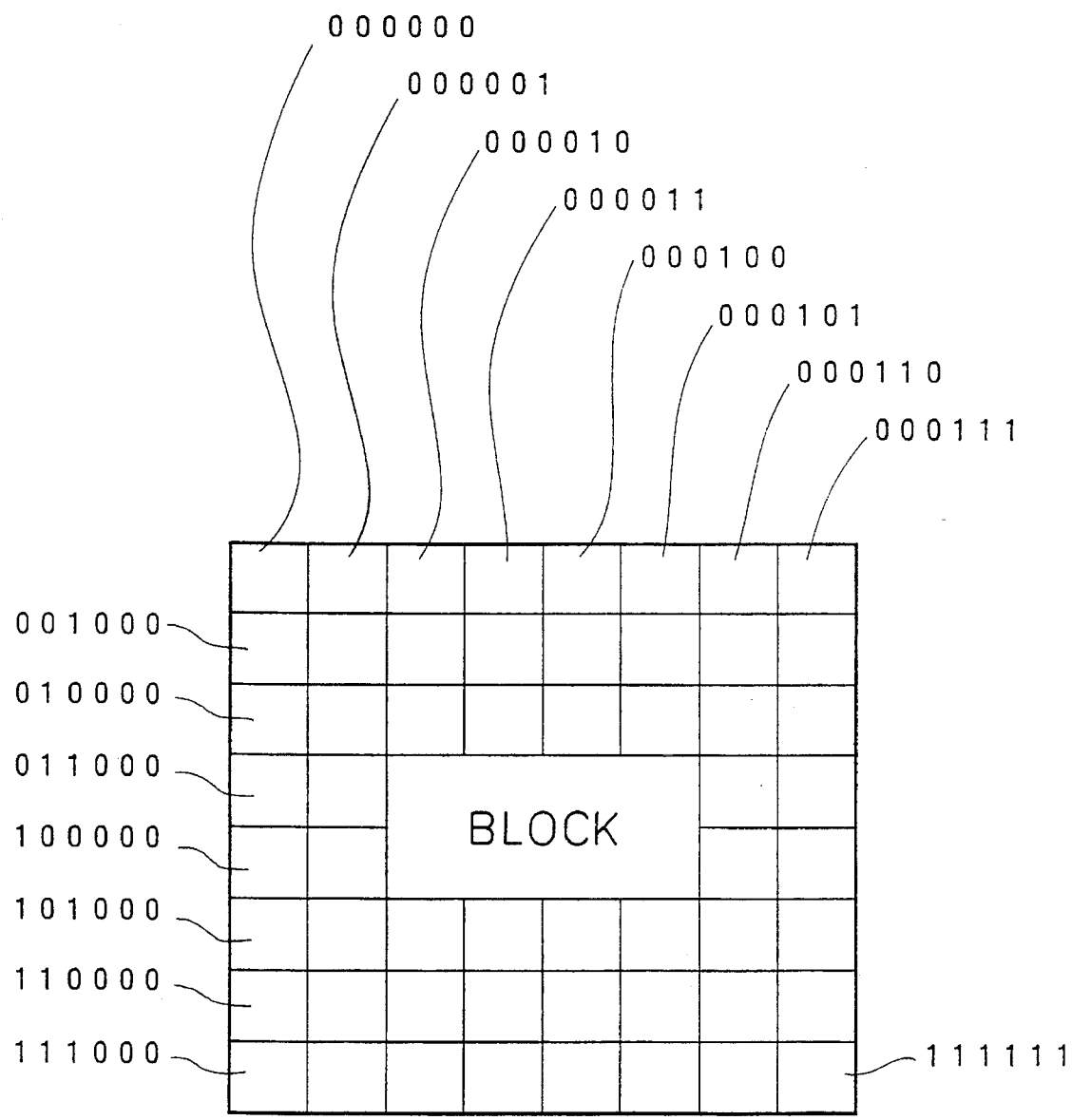
FIG. 6 is a diagram showing an example of the assignment of memory addresses to 64 elements together forming one block.
Figure 7:
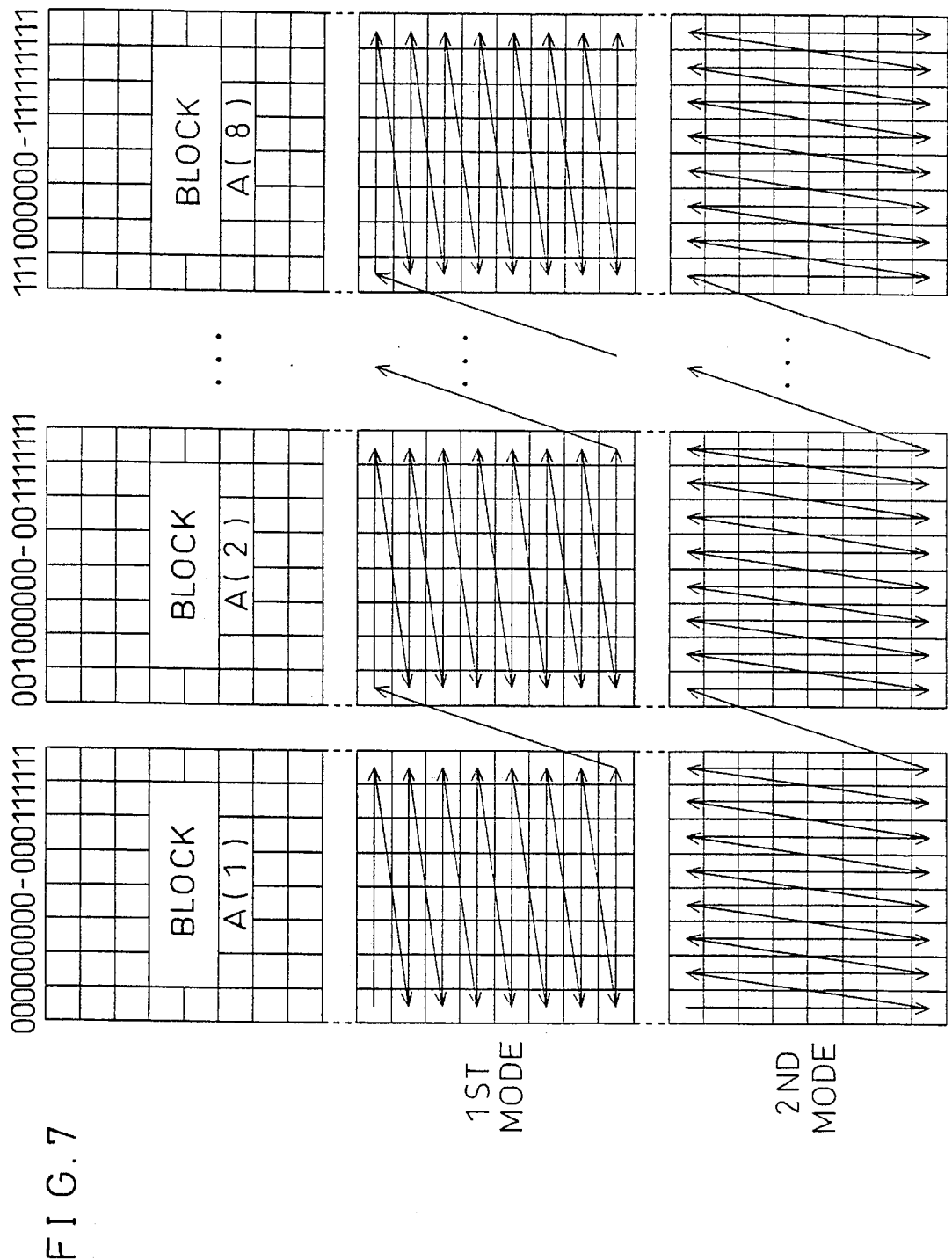
FIG. 7 describes the FIG. 4 address generators' operating modes.

FIG. 6 is an example of the assignment of memory addresses with respect to 8×8 elements forming a single block. The six rightmost bits of the output of the address generator of FIG. 5 (from "000000" to "111111" in the binary notation) serve as an intrablock address, and the remaining bits, i.e., the three leftmost bits (from "000" to "111"), are used for block designation. As shown in FIG. 7, in the first mode, if the output of the 9-bit counter 501 makes a change from "000000000" to "000111111", then row vectors of a BLOCK A(1) are accessed in sequence. If the 9-bit counter 501 output then makes a change from "001000000" to "001111111", then row vectors of a BLOCK A(2) are accessed in sequence. If the 9-bit counter 501 output makes a change from "111000000" to "111111111", then row vectors of a BLOCK A(8) are accessed in sequence. On the other hand, in the second mode, if the output of the 9-bit counter 501 makes a change from "000000000" to "000111111", then column vectors of BLOCK A(1) are accessed in sequence. If the 9-bit counter 501 output then makes a change from "001000000" to "001111111", then column vectors of BLOCK A(2) are accessed in sequence. If the 9-bit counter 501 output makes a change from "111000000" to "111111111", then column vectors of BLOCK A(8) are accessed in sequence. As described above, the use of addresses generated by means of the address generator of FIG. 5 provides, in each of the first and second modes, continuous access to a maximum of 8 blocks (each block including 8×8 elements) spread within a one-dimensional memory space. An address generator having a first and a second mode for accessing m blocks each block including n×n elements may be formed by an (n+n+m)-bit counter and n 2-input selectors.

Figure 8:
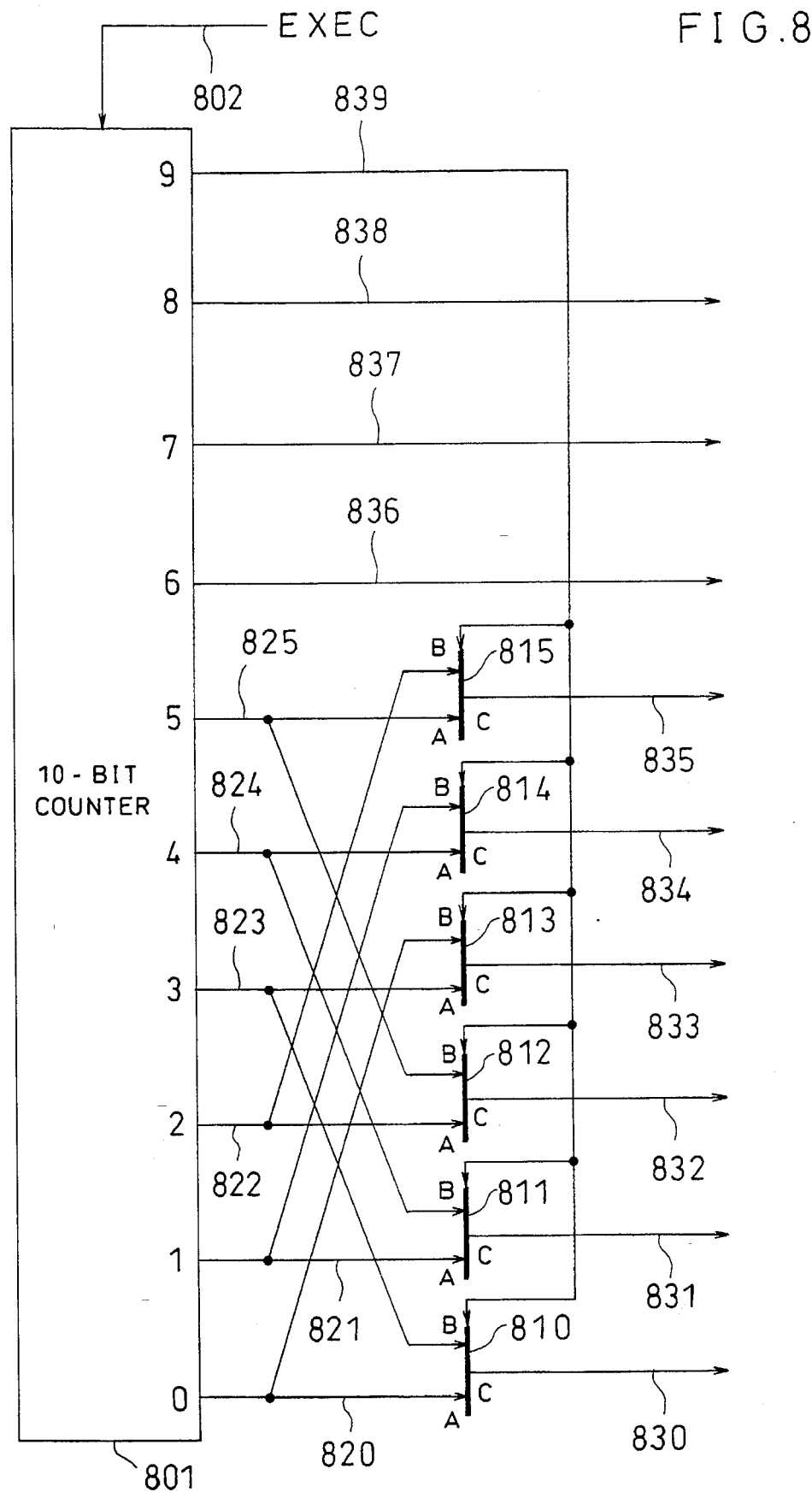
FIG. 8 is a block diagram showing another organization of each address generator as shown in FIG. 4.

FIG. 8 shows another example of the structure of the address generators 405, 406 of FIG. 4. 801 is a 10-bit counter. 810–815 are selectors. 802 is a counter control signal (EXEC). Signals 820–825, 836–839 are the bit outputs of the 10-bit counter 801. Signals 830–835 are the respective outputs of the selectors 810–815. The signals 830–838 are the outputs of the address generator, and the signal 839, as a mode switch signal, is connected to a switch input of each selector 810–815. The 10-bit counter 801 is a binary counter that is controlled by the EXEC 802 and is able to repeatedly count from 0 up to 1023. Each selector 810–815 has two inputs A, B and one output C and selects one of these two inputs according to the switch input. The inputs A of the selectors 810–815 are coupled to the signals 820–825, respectively. The inputs B of the selectors 810–812 are coupled to the signals 823–825, respectively. The inputs B of the selectors 813–815 are coupled to the signals 820–822, respectively. The outputs C of the selectors 810–815 are coupled to the signals 830–835, respectively. Each switch input of the selectors 810–815 is coupled to the signal 839.

In the address generator as depicted in FIG. 8, the switching of the selectors 810–815 is executed using the signal 839, i.e., the leftmost bit of the output of the 10-bit counter 801. Accordingly, the switching between the first mode and the second mode is performed automatically. In other words, upon completion of the first-mode processing of all the eight blocks, the second-mode processing commences right away. An address generator having a first and a second mode capable of successively accessing m blocks each block including n×n elements in the first mode and the second mode may be formed by an (n+n+m+1)-bit counter and n 2-input selectors.

In the present embodiment, the first single-port memory 401 for storing the two-dimensional data A and C is provided independently of the second single-port memory 402 for storing the two-dimensional data B. However, the data A, B, and C may be stored in the same memory. The reason is that, since the result of the processing of $A(h)_{y=i}$ is written to at the address of $B(h)_{y=i}$ by the OPERATION X(h), the data A and the data B can be superimposed at the same storage domain. Additionally, since the result of the processing of $B(h)_{x=j}$ is written to at the address of $C(h)_{x=j}$ by the OPERATION Y(h), the data B and the data C can be superimposed at the same storage domain. Therefore, less storage is required.

PREFERRED EMBODIMENT 3

Figure 9:
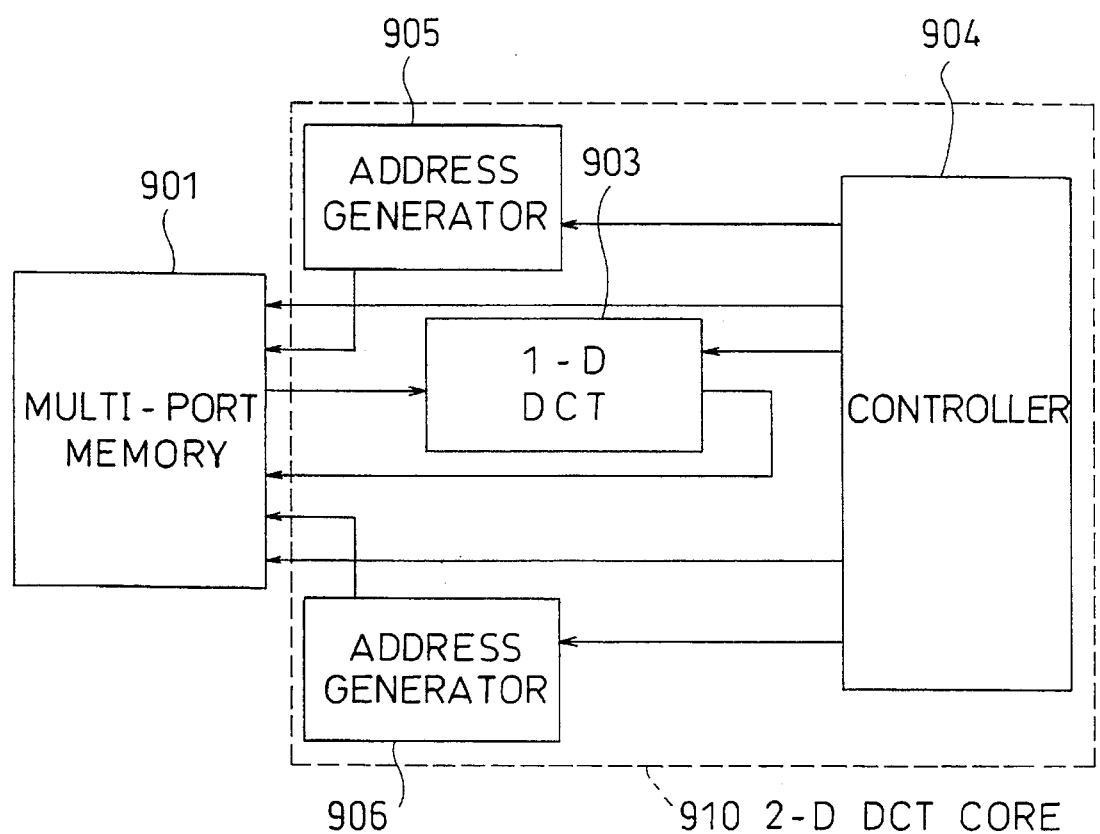
FIG. 9 is a block diagram showing a two-dimensional DCT processor of the third embodiment.

FIG. 9 shows a two-dimensional DCT processor of the third preferred embodiment. In the present embodiment, the first and second single-port memories 401 and 402 are unified to a single memory. 901 is a multiport memory. 903 is a one-dimensional DCT processor. 904 is a control unit. 905 is a first address generator with the same internal configuration as the FIG. 5 address generator or as the FIG. 8 address generator. 906 is a second address generator with the same internal configuration as the FIG. 5 address generator or as the FIG. 8 address generator. 910 is a two-dimensional DCT core made up of the one-dimensional DCT processor 903, the control unit 904, and the first and second address generators 905, 906. The multiport memory 901 is a memory, e.g., a dual port memory, capable of simultaneously performing read/write operations and collectively storing a data group A(h) of m data items each of which is composed of n×n elements. The result of the one-dimensional DCT of A(h), or a data group B(h) (h=1, 2, ..., m), is stored in the same storage domain that A(h) is stored in the multiport memory 901. The result of the one-dimensional DCT of B(h), or a data group C(h) (h=1, 2, ..., m), is stored in the same storage domain that B(h) is stored in the multiport memory 901. The one-dimensional DCT processor 903 is identical in function with the one-dimensional DCT processor 103 of FIG. 1 as well as with the one-dimensional DCT processor 403 of FIG. 4.

The first address generator 905 is a means for controlling the read operation of the multiport memory 901. The first address generator 905 has two modes, the first mode and the second mode. In the first mode, on the one hand, the first address generator 905 generates addresses in order that, for i=1, 2, ..., n, and for h=1, 2, ..., m, an ith row vector of A(h), i.e., $A(h)_{y=i}$, is read from the multiport memory 901. In the second mode, on the other hand, the first address generator 905 generates addresses in order that, for j=1, 2, ..., n, and for h=1, 2, ..., m, a jth column vector of B(h), i.e., $B(h)_{x=j}$, is read from the multiport memory 901. The second address generator 906 is a means for controlling the write operation of the multiport memory 901 and has two modes, the first mode and the second mode. In the first mode, on the one hand, the second address generator 906 generates addresses in order that, for i=1, 2, ..., n, and for h=1, 2, ..., m, an ith row vector of B(h), i.e., $B(h)_{y=i}$, is written to the multiport memory 901. In the second mode, on the other hand, the second address generator 906 generates addresses in order that, for j=1, 2, ..., n, and for h=1, 2, ..., m, a jth column vector of C(h), i.e., $C(h)_{x=j}$, is written to the multiport memory 901.

The control unit 904 exerts its control as follows. The control unit 904 causes the first address generator 905 to be activated in the first mode in order that, for i=1, 2, ..., n, and for h=1, 2, ..., m, an ith row vector $A(h)_{y=i}$ is read from the multiport memory 901. $A(h)_{y=i}$ thus read is transmitted to the one-dimensional DCT processor 903. In response, the one-dimensional DCT processor 903 computes a product of matrices, i.e., $T_{y=i}A(h)_{y=i}$. The control unit 904 also causes the second address generator 906 to be activated in the first mode in order that the product thus found by the one-dimensional DCT processor 903 is written to at an address of a corresponding ith row vector $B(h)_{y=i}$ of the multiport memory 901, for i=1, 2, ..., n, and for h=1, 2, ..., m. The control unit 904 then causes the first address generator 905 to be activated in the second mode in order that, for j=1, 2, ..., n, and for h=1, 2, ..., m, a jth column vector $B(h)_{x=j}$ is read from the multiport memory 901. $B(h)_{x=j}$ thus read is transmitted to the one-dimensional DCT processor 903. In response, the one-dimensional DCT processor 903 computes a product of matrices, i.e., $T_{y=j}B(h)_{x=j}$. The control unit 904 also causes the second address generator 906 to be activated in the second mode in order that the product thus found by the one-dimensional DCT processor 903 is written to at an address of a corresponding jth column vector $C(h)_{x=j}$ of the multiport memory 901, for j=1, 2, ..., n, and for h=1, 2, ..., m. The control unit 904 delays the activation of the second address generator 906 by the number of cycles proportional to pipeline delay of the one-dimensional DCT processor 903 with respect to the activation of the first address generator 905.

In accordance with the two-dimensional DCT processor of FIG. 9, as in the first embodiment, the blank time in processing is cancelled (see FIGS. 2 and 3). This increases the rate of the two-dimensional continuous DCT of plural blocks. In the FIG. 2 example, the operation to write B(1) to the memory and the operation to read A(2) from the memory must be performed concurrently, which is implemented by the multiport memory 901 in the present embodiment.

In each of the first to third preferred embodiments, the A(h)'s row vectors are transformed into B(h) and the B(h)'s column vectors are transformed into C(h), to find a set of two-dimensional DCT coefficients. However, the order of such processing may be reversed. In other words, the A(h)'s column vectors are transformed into B(h) and the B(h)'s row vectors are transformed into C(h).

PREFERRED EMBODIMENT 4

Figure 10:
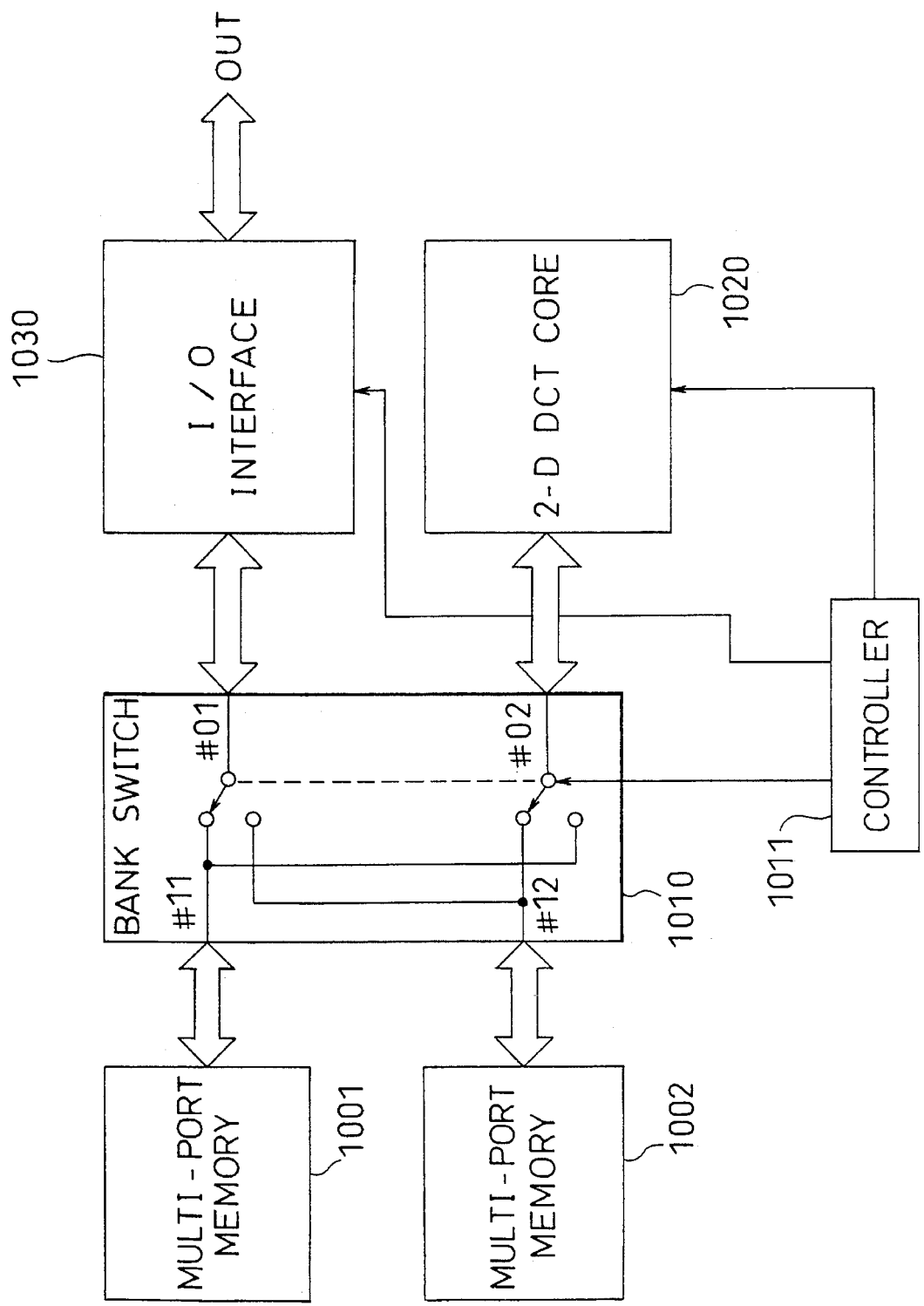
FIG. 10 is a block diagram showing a two-dimensional DCT processor of the fourth embodiment.

FIG. 10 is a block diagram showing a two-dimensional DCT processor of the fourth preferred embodiment. In the present embodiment, the multiport memory 901 of FIG. 9 is doubly provided. 1001 is a first multiport memory (BANK 1). 1002 is a second multiport memory (BANK 2). 1010 is a bank switch unit. 1020 is a two-dimensional DCT core. 1030 is an external input/output interface. 1011 is a control unit. Each multiport memory 1001, 1002 is identical in function with the multiport memory 901 of FIG. 9.

The bank switch unit 1010 has a port #01 associated with the I/O interface 1030, a port #02 associated with the two-dimensional DCT core 1020, a port #11 associated with the first multiport memory 1001, and a port #12 associated with the second multiport memory 1002. The bank switch unit 1010 is capable of performing the toggle-switching of the connection of the first and second multiport memories 1001, 1002 with the I/O interface 1030 and the two-dimensional DCT core 1020. More specifically, the bank switch unit 1010 performs a change between a state where the first multiport memory 1001 is assigned to the I/O interface 1030 and the second multiport memory 1002 is assigned to the two-dimensional DCT core 1020 and a state where the first multiport memory 1001 is assigned to the two-dimensional DCT core 1020 and the second multiport memory 1002 is assigned to the I/O interface 1030.

The two-dimensional DCT core 1020 operates the same way as the two-dimensional DCT core 910 of FIG. 9 in processing the data of an assigned multiport memory. The I/O interface 1030 is capable of writing data into an assigned multiport memory and reading data from an assigned multiport memory.

Figure 11:
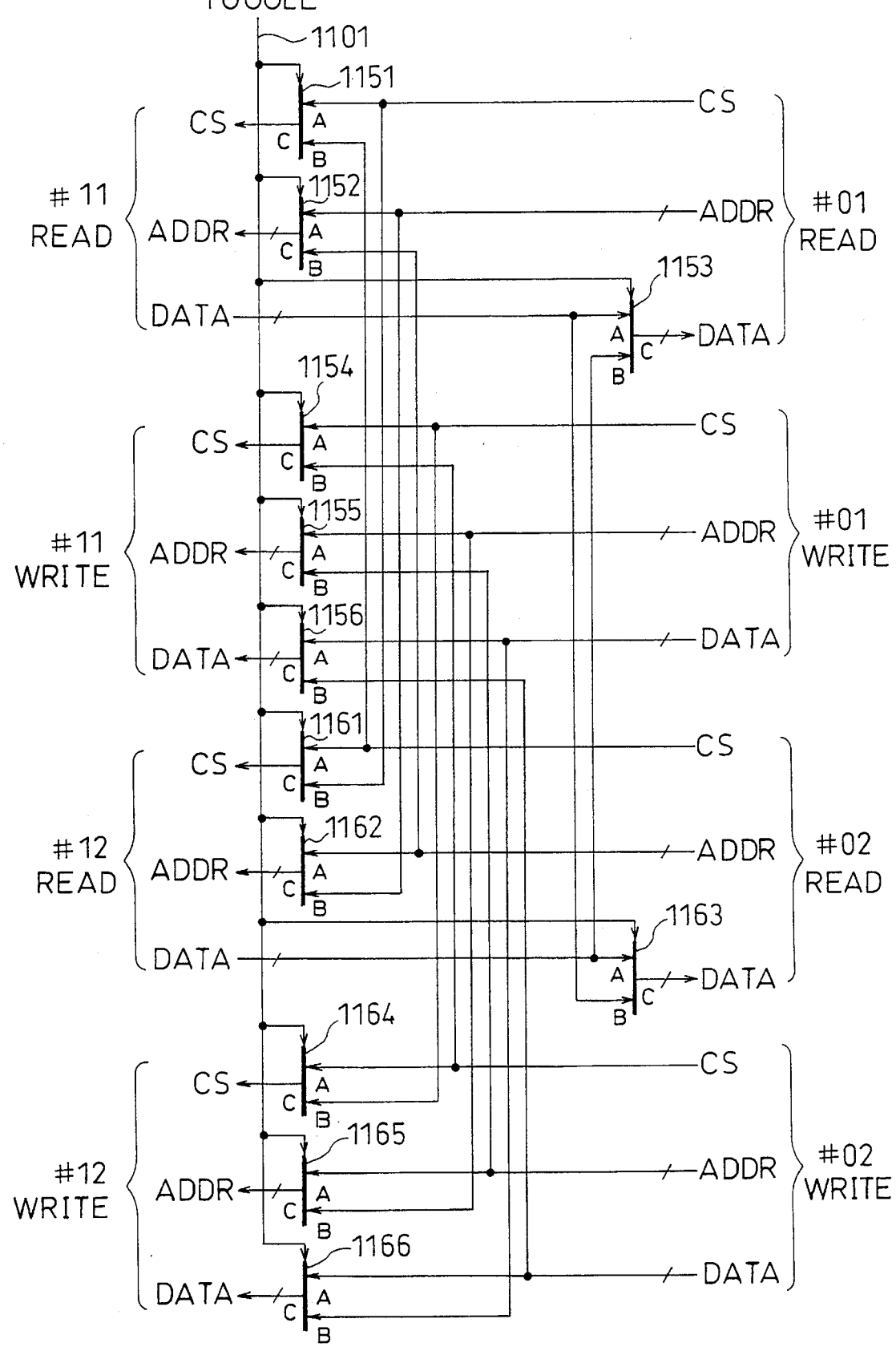
FIG. 11 is a block diagram showing an organization of a bank switch unit as shown in FIG. 10.

FIG. 11 shows an example of the structure of the bank switch unit 1010 of FIG. 10. 1151–1156, 1161–1166 are 2-input bus selectors. Each bus selector 1151–1156, 1161–1166, having two inputs A and B and one output C, selects one of the two inputs A and B. Each port #01, #02, #11, #12 holds a chip selection signal (CS), an address signal (ADDR), and a data signal (DATA), for the read/write operations of the memories. Each bus selector 1151–1156, 181–1166 performs a change between a state where the port #01 is connected to the port #11 and the port #02 is connected to the port #12 and a state where the port #01 is connected to the port #12 and the port #02 is connected to the port #11.

Figure 12:
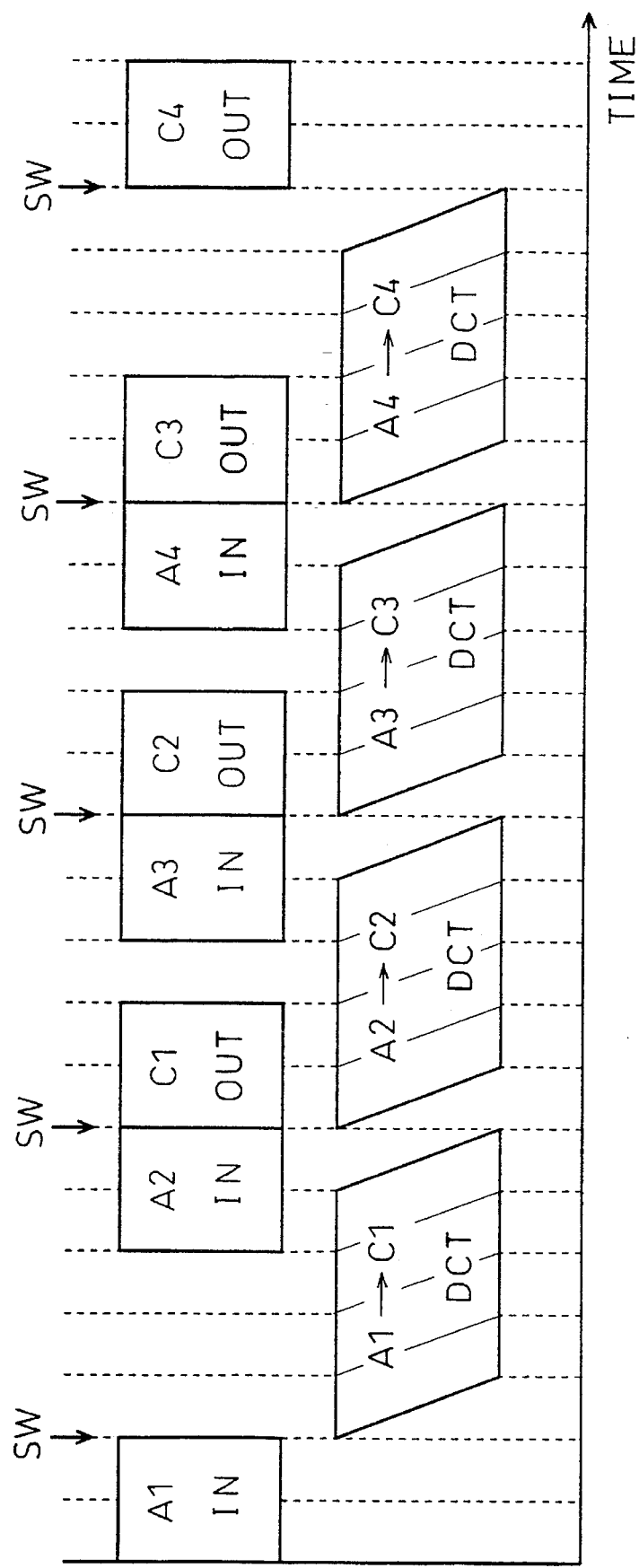
FIG. 12 is a timing chart showing the operation of the FIG. 10 two-dimensional DCT processor.

FIG. 12 is a timing chart showing the operation of the two-dimensional DCT processor of FIG. 10. This timing chart shows an example in which four macro blocks A1, A2, A3, and A4 are processed one after another. Each macro block A1, A2, A3, and A4 is made up of m blocks each block including n×n data elements. First, the control unit 1011 issues an instruction to the bank switch unit 1010 in order that the first multiport memory 1001 is assigned to the I/O interface 1030. The control unit 1011 then controls the I/O interface 1030 in order that a first two-dimensional data group A(h) (h=1, 2, . . . , m) (i.e., the first macro block A1) is inputted from the outside to the first multiport memory 1001 that is assigned to the I/O interface 1030. Next, the control unit 1011 causes the bank switch unit 1010 to perform toggle switching (see the leftmost SW of FIG. 12), so that the second multiport memory 1002 is assigned to the I/O interface 1030 and the first multiport memory 1001 is assigned to the two-dimensional DCT core 1020. Then, the control unit 1011 controls the I/O interface 1030 in order that a second two-dimensional data group A(h) (h=1, 2, . . . , m) (i.e., the second macro block A2) is inputted from the outside to the second multiport memory 1002, while at the same time controlling the two-dimensional DCT core 1020 in such a way as to perform the two-dimensional DCT of the first macro block A1 on the first multiport memory 1001. As a result, C1 (i.e., the result of the two-dimensional DCT of A1) is overwritten to the first multiport memory 1001. At this time, as previously described in the third embodiment (see FIG. 9), the blank time in the processing of the one-dimensional DCT processor in the two-dimensional DCT core 1020 is cancelled (see FIGS. 2 and 3). This increases the speed of the two-dimensional continuous DCT of m blocks, i.e., A(h) (h=1, 2, . . . , m). Thereafter, the control unit 1011 again directs the bank switch unit 1010 to perform toggle switching between the banks (see the second leftmost SW of FIG. 12) in order that the first multiport memory 1001 is assigned to the I/O interface 1030 and the second multiport memory 1002 is assigned to the two-dimensional DCT core 1020. Then, the control unit 1011 controls the I/O interface 1030 in order that C1 on the first multiport memory 1001 is provided outside, and a third two-dimensional data group A(h) (h=1, 2, . . . , m), i.e., the third macro block A3, is inputted to the first multiport memory 1001, while at the same time controlling the two-dimensional DCT core 1020 in such a way as to perform the two-dimensional DCT of the second macro block A2 on the second multiport memory 1002. The control unit 1011 repeatedly exerts such control, and finally controls the I/O interface 1030 in order that C4 (i.e., the final result of the two-dimensional DCT) is provided outside.

Figure 13:
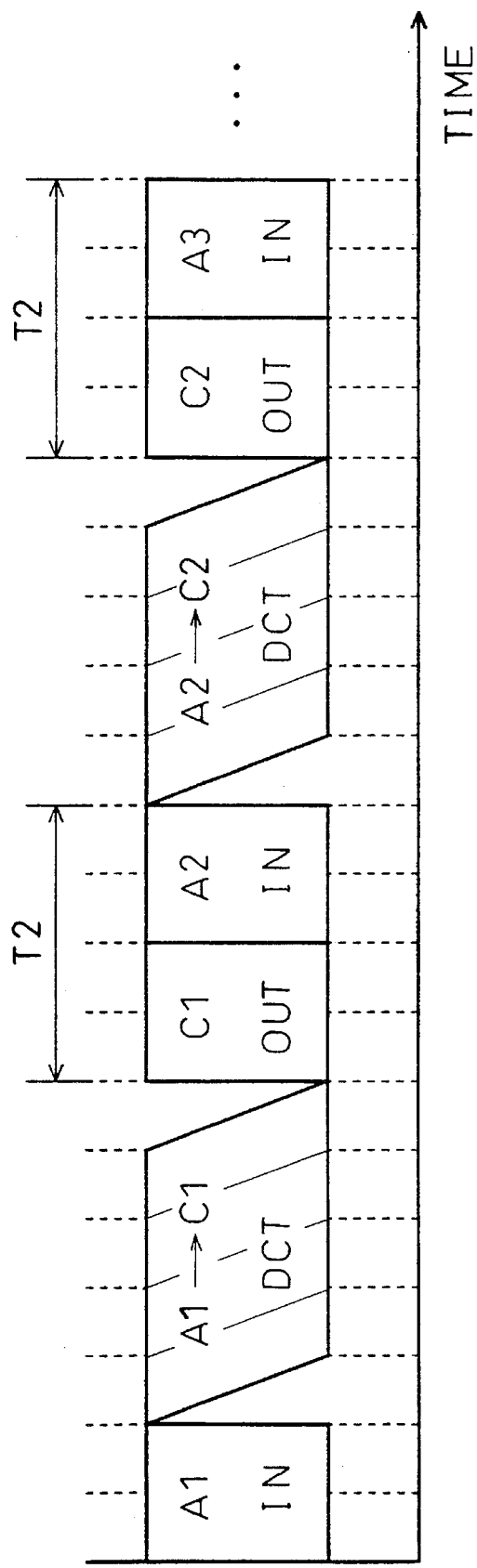
FIG. 13 is a timing chart showing the operation of a compare example of the FIG. 10 two-dimensional DCT processor.

FIG. 13 shows a compare example using no plural multiport banks (see FIG. 9). A1 is inputted to a memory from the outside. After C1, i.e., the result of the two-dimensional DCT of A1 found by a two-dimensional DCT core, is provided outside from the memory, A2 is inputted to the memory from the outside. After C2, found by the two-dimensional DCT core, is provided outside from the memory, A3 is inputted from the outside to the memory. Practically, the time taken to write target two-dimensional data into the memory and the time taken to read target data from the memory are not nil. This will create the blank time T2 in the processing of the two-dimensional DCT core.

Conversely, in accordance with the two-dimensional DCT processor of FIG. 10, the blank time T2 is cancelled by performing toggle-switching between memory banks. Therefore, as compared with the FIG. 13 case, the speed of the two-dimensional continuous DCT of plural macro blocks is increased.

PREFERRED EMBODIMENT 5

Figure 14:
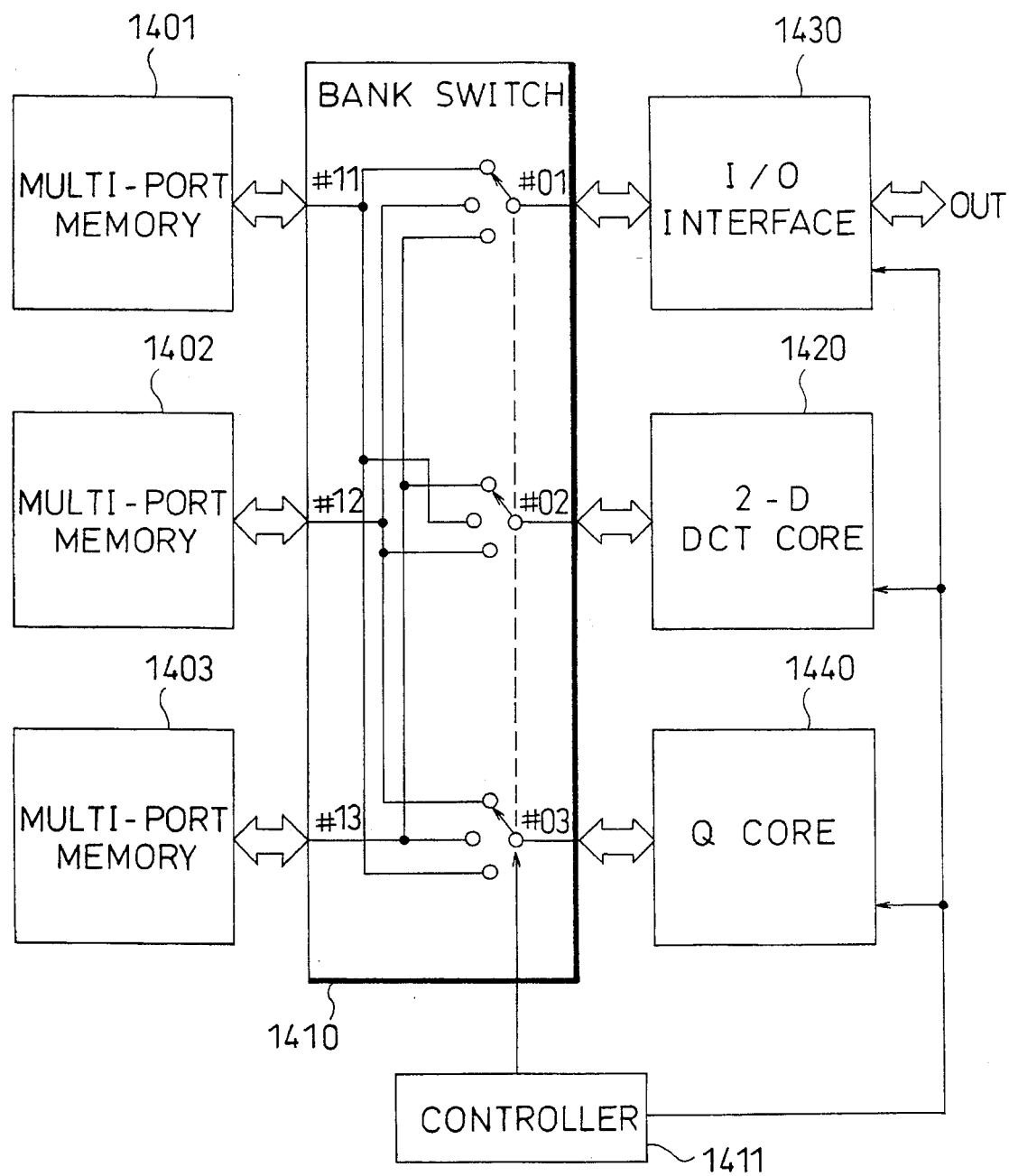
FIG. 14 is a block diagram showing a two-dimensional DCT/quantization processor of the fifth embodiment.

FIG. 14 shows a two-dimensional DCT/quantization processor of the fifth preferred embodiment. The present embodiment is a revision of the two-dimensional DCT processor of FIG. 10, further including another multiport memory and a quantization core. 1401 is a first multiport memory (BANK 1). 1402 is a second multiport memory (BANK 2). 1403 is a third multiport memory (BANK 3). 1410 is a bank switch unit. 1420 is a two-dimensional DCT core. 1430 is an I/O interface. 1440 is a quantization core. 1411 is a control unit. Each multiport memory 1401–1403 is identical in function with the multiport memory 901 of FIG. 9 as well as with each multiport memory 1001, 1002 of FIG. 10.

The bank switch unit 1410 has a port #01 associated with the I/O interface 1430, a port #02 associated with the two-dimensional DCT core 1420, a port #03 associated with the quantization core 1440, a port #11 associated with the first multiport memory 1401, a port #12 associated with the second multiport memory 1402, and a port #13 associated with the third multiport memory 1403. The bank switch unit 1410 is able to perform the toggle switching of the connection of the first to third multiport memories 1401–1403 with the I/O interface 1430, the two-dimensional DCT core 1420 and the quantization core 1440. The bank switch unit 1410 performs toggle switching among a first toggle state, a second toggle state, and a third toggle state. The first toggle state is a state in which the port #01 is connected with the port #11 the port π02 with the port #13, and the port #03 with the port #12. The second toggle state is a state in which the port #01 is connected with the port #12, the port #02 with the port #11, and the port #03 with the port #13. The third toggle state is a state in which the port #01 is connected with the port #13, the port #02 with the port #12, and the port #03 with the port #11. In the first toggle state the first multiport memory 1401 is assigned to the I/O interface 1430, the third multiport memory 1403 to the two-dimensional DCT core 1420, and the second multiport memory 1402 to the quantization core 1440. In the second toggle state, the second multiport memory 1402 is assigned to the I/O interface 1430, the first multiport memory 1401 to the two-dimensional DCT core 1420, and the third multiport memory 1403 to the quantization core 1440. In the third toggle state, the third multiport memory 1403 is assigned to the I/O interface 1430, the second multiport memory 1402 to the two-dimensional DCT core 1420, and the first multiport memory 1401 to the quantization core 1440.

The two-dimensional DCT core 1420 operates the same way as the two-dimensional DCT core 1010 of FIG. 10 in processing the data of an assigned multiport memory. The quantization core 1440, having a pipeline structure, performs the quantization of the data stored in an assigned multiport memory and stores the quantized data into such an assigned multiport memory. The I/O interface 1430 is capable of writing incoming data into an assigned multiport memory and reading desired data from an assigned multiport memory to the outside.

Figure 15:
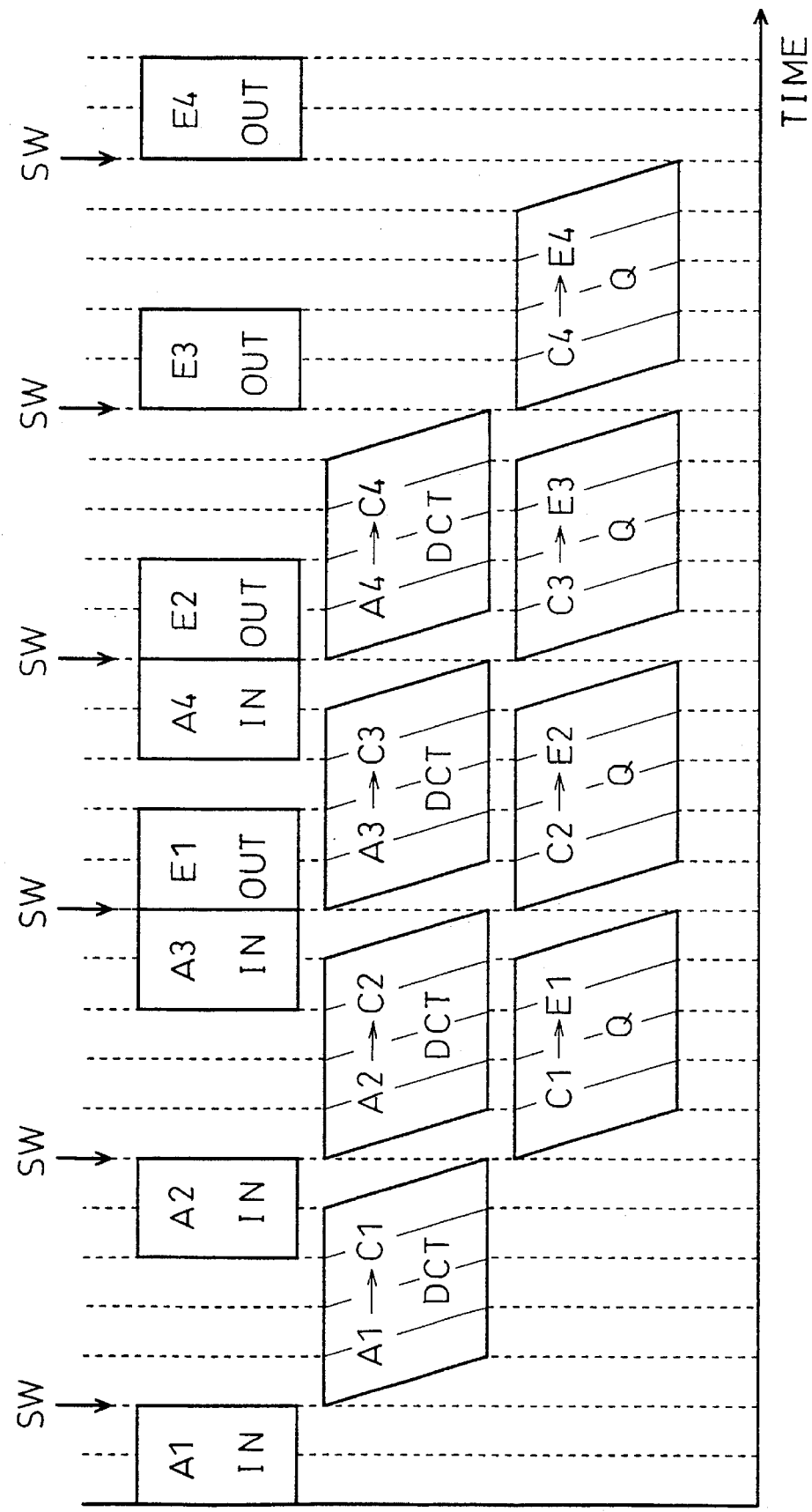
FIG. 15 is a timing chart showing the operation of the two-dimensional DCT/quantization processor of FIG. 14.

FIG. 15 is a timing chart showing the operation of the two-dimensional DCT/quantization processor of FIG. 14. This timing chart shows a case in which four macro blocks A1, A2, A3, and A4 are processed in sequence. Each macro block A1, A2, A3, and A4 is made up of m blocks each block including n×n data elements. First, the control unit 1411 issues to the bank switch unit 1401 an instruction indicative of switching to the first: toggle state and requests the I/O interface 1430 to input data from the outside. As a result, a first two-dimensional data group A(h) (h=1, 2, . . . , m), i.e., the first macro block A1, is inputted to the first multiport memory 1401 assigned to the I/O interface 1430. Next, the control unit 1411 issues to the bank switch unit 1401 an instruction indicative of switching to the second toggle state (see the leftmost SW of FIG. 15) and requests the I/O interface 1430 and the two-dimensional DCT core 1420 to input data from the outside and to execute a two-dimensional DCT, respectively. As a result, a second two-dimensional data group A(h) (h=1, 2, . . . , m), i.e., the second macro block A2, is inputted to the second multiport memory 1402 assigned to the I/O interface 1430, and the two-dimensional DCT core 1420 performs the two-dimensional DCT of A1 on the first multiport memory 1401. The result of the two-dimensional DCT of A1 is C1. At this time, as previously described in the third embodiment (see FIG. 9), the blank time in the processing of the one-dimensional DCT processor in the two-dimensional DCT core 1420 is cancelled. This increases the rate of the two-dimensional continuous DCT of m blocks. Next, the control unit 1411 issues to the bank switch unit 1410 an instruction indicative of switching to the third toggle state (see the second leftmost SW of FIG. 15) and requests the I/O interface 1430, the two-dimensional DCT core 1420, and the quantization core 1440 to input data from the outside, to execute a two-dimensional DCT, and to execute a quantization operation. As a result of such arrangement, (i) inputting a third two-dimensional data group A(h) (h=1, 2, . . . , m), i.e., the third macro block A3, to the third multiport memory 1403 assigned to the I/O interface 1430, (ii) performing the two-dimensional DCT of A2 on the second multiport memory 1402, the result of which is C2, and (iii) quantizing C1 on the first multiport memory 1401, the result of which is E1, are executed at the same time. At this time, in the quantization core 1440, the pipeline processing of m blocks is continuously performed at high speed, as in the two-dimensional DCT core 1420. Next, the control unit 1411 issues to the bank switch unit 1410 an instruction indicative of switching to the first toggle state (see the next SW of FIG. 15) and requests the I/O interface 1410, the two-dimensional DCT core 1420, and the quantization core 1440 to provide data to the outside and then input data from the outside, to execute a two-dimensional DCT, and to execute a quantization operation. As a result of such arrangement, (i) reading E1 on the first multiport memory 1401 assigned to the I/O interface 1430 and providing same to the outside and then inputting a fourth two-dimensional data group A(h) (h=1, 2, . . . , m), i.e., the fourth macro block A4, into the first multiport memory 1401, (ii) performing the two-dimensional DCT of A3 on the third multiport memory 1403, the result of which is C3, and (iii) quantizing C2 on the second multiport memory 1402, the result of which is E2, are performed at the same time. Thereafter, the control unit 1411 repeatedly exerts such control as to cause the I/O interface 1430 to provide E4 (i.e., the final result of the two-dimensional DCT/quantization) to the outside.

Figure 16:
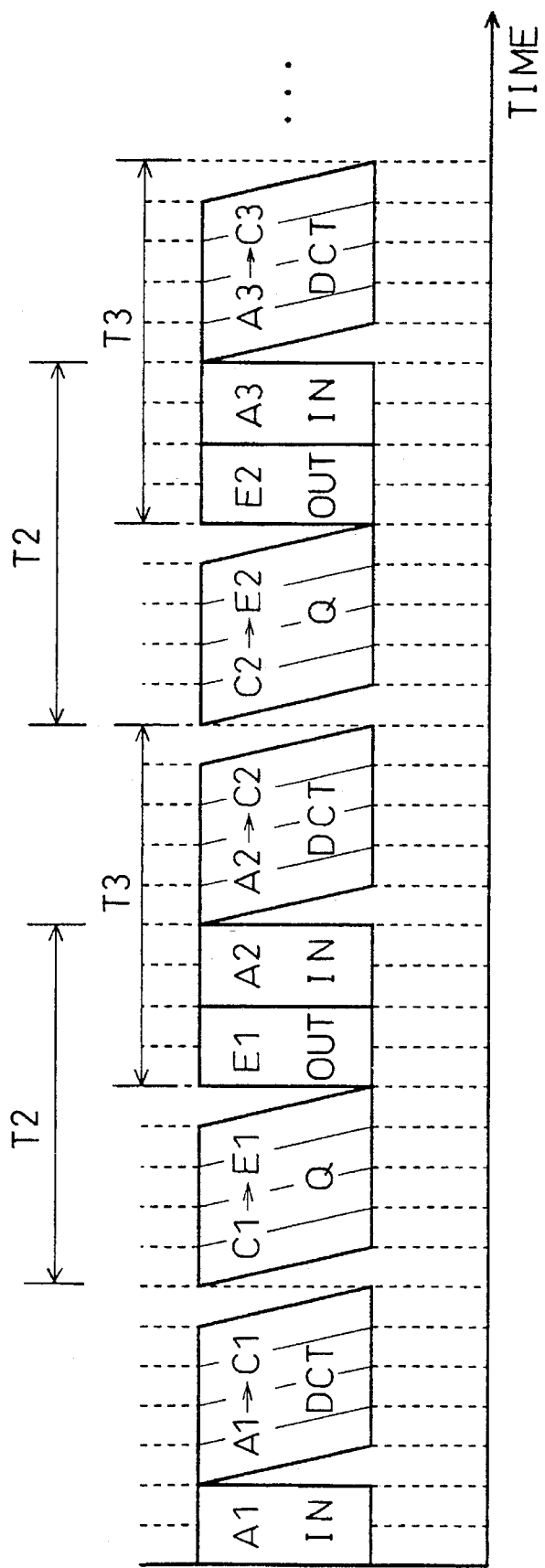
FIG. 16 is a timing chart showing the operation of a compare example of the FIG. 14 two-dimensional DCT/quantization processor.

FIG. 16 shows a compare example employing a single multiport memory. A1 is inputted to the memory from the outside. A1 is subjected to a two-dimensional DCT, the result of which, i.e., C1, is quantized to yield E1. E1 is provided outside from the memory. Thereafter, A2 is inputted to the memory from the outside. A2 is subjected to a two-dimensional DCT to yield C2. C2 is quantized to yield E2. E2 is provided outside from the memory. Then, A3 is inputted into the memory from the outside. In accordance with the FIG. 16 time chart, due to the data input/output and quantization processing, the blank time T2 is created in the processing of the two-dimensional DCT core, and due to the data input/output and two-dimensional DCT processing, the blank time T3 is created in the processing of the quantization core.

Conversely, in accordance with the two-dimensional DCT/quantization processor of FIG. 14, the blank times T2 and T3 are cancelled by performing toggle-switching between the memory banks (see FIG. 15). Therefore, compared with the case of FIG. 16, the rate of the two-dimensional continuous DCT and quantization of plural macro blocks is improved.

If the two-dimensional DCT core 1420 and the quantization core 1440 are replaced with a core for two-dimensional inverse DCT and a core for inverse quantization, respectively, and if the bank switch unit 1410 changes the order of switching states (i.e., the first toggle state, the third toggle state, the second toggle state, the first toggle state, the third toggle state, the second toggle state, and the first toggle state in that order), this implements a processor capable of performing complicated processing (inverse quantization→ inverse DCT) required in a decoder, thereby increasing the rate of the continuous processing of plural macro blocks. If the number of banks is increased, this increases the rate of the illustrative more complicated continuous processing, i.e., DCT→quantization→variable-length coding, which is required in an encoder.

PREFERRED EMBODIMENT 6

Figure 17:
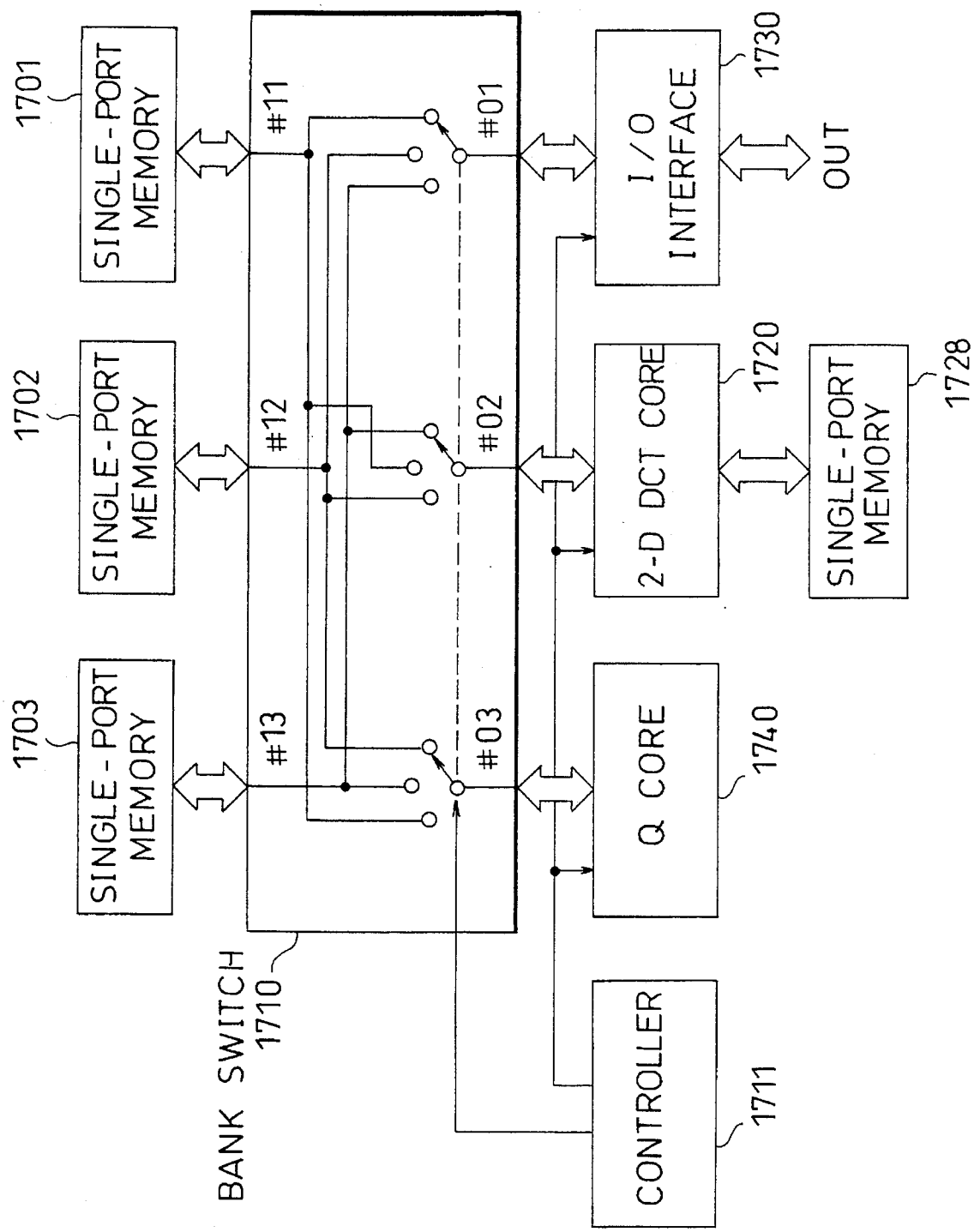
FIG. 17 is a block diagram showing a two-dimensional DCT/quantization processor of the sixth embodiment.

FIG. 17 is a block diagram showing a two-dimensional DCT/quantization processor in accordance with the sixth preferred embodiment. In the present embodiment, the first to third multiport memories 1401–1403 of FIG. 14 are replaced with respective single-port memories, and a two-dimensional DCT core is employed which is a result of removing one of the single-port memories in the second embodiment (see FIG. 4). 1701 is a first single-port memory (BANK 1). 1702 is a second single-port memory (BANK 2). 1703 is a third single-port memory (BANK 3). 1710 is a bank switch unit. 1720 is a two-dimensional DCT core. 1728 is a single-port memory provided exclusively for the two-dimensional DCT core 1720. 1730 is an I/O interface. 1740 is a quantization core. 1711 is a control unit. The first to third single-port memories 1701–1703, the two-dimensional DCT core 1720, and the single-port memory 1728 of FIG. 17 correspond to the first single-port memory 401, the two-dimensional DCT core 410, and the second single-port memory 402 of FIG. 4, respectively.

Figure 18:
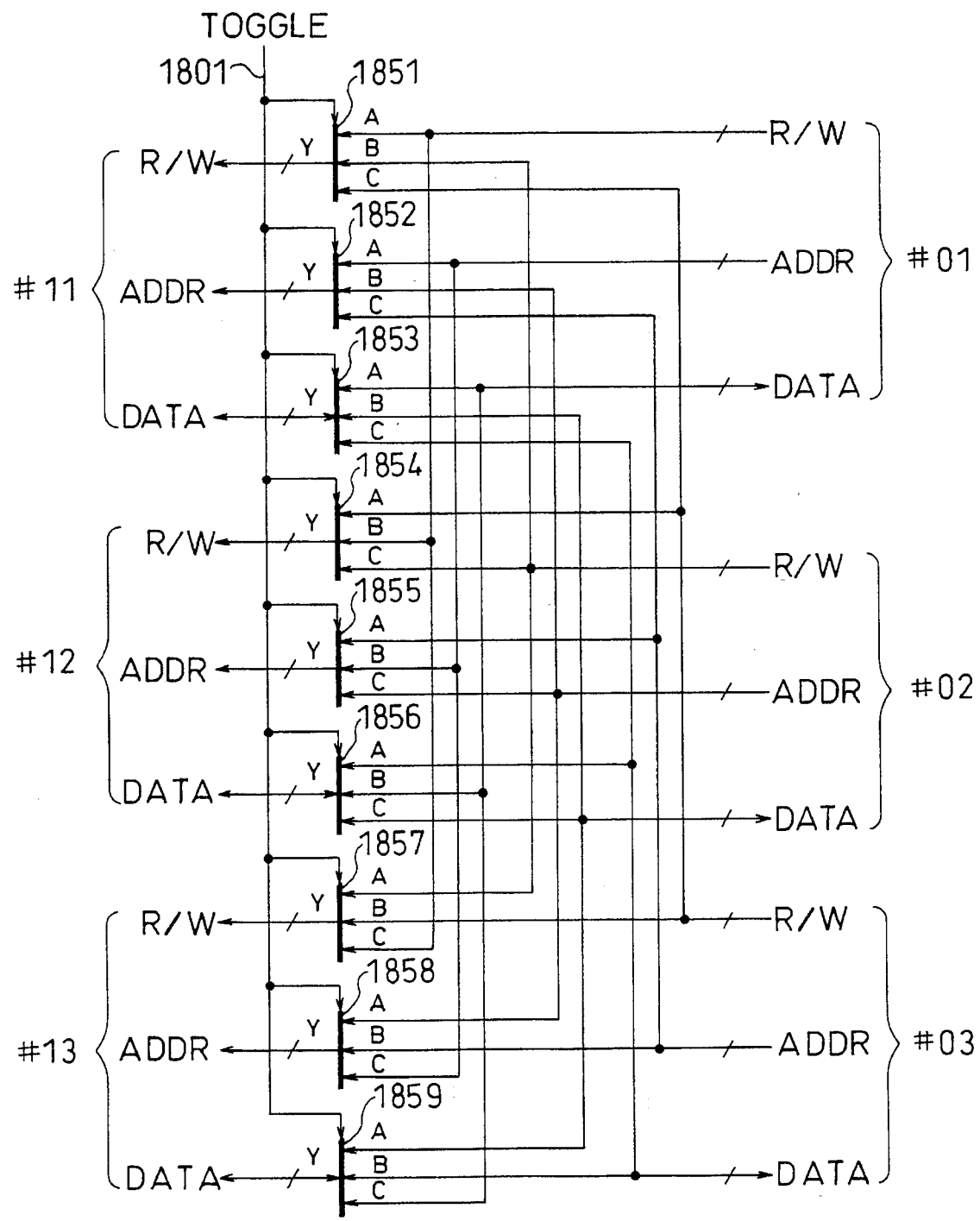
FIG. 18 is a block diagram showing an organization of a bank switch unit of FIG. 17.

FIG. 18 shows an example of the structure off the bank switch unit 1710 of FIG. 17. 1851, 1852, 1854, 1855, 1857, and 1858 are one-way bus selectors. 1853, 1856, and 1859 are bidirectional bus selectors. Each port #01, #02, #03, #11, #12, and #13 holds a memory read/write signal R/W, an address signal ADDR, and a data signal DATA. More specifically, according to a toggle switch signal (TOGGLE) 1801, the bus selectors 1851–1859 perform toggle switching among a first toggle state, a second toggle state, and a third toggle state. The first toggle state is a state in which the port #01 is connected with the port #11, the port #02 with the port #13, and the port #03 with the port #12. The second toggle state is a state in which the port #01 is connected with the port #12, the port #02 with the port #11 and the port #03 with the port #13. The third toggle state is a state in which the port #01 is connected with the port #13, the port #02 with the port #12, and the port #03 with the port #11.

In accordance with the two-dimensional DCT/quantization processor of FIG. 17, as in the fifth embodiment employing plural multiport memories, the blank time in processing is cancelled (see FIGS. 15 and 16). The rate of the two-dimensional DCT/quantization of plural macro blocks is increased. Further, as in the fifth embodiment, the FIG. 17 structure may be modified into a structure suitable for a processor capable of performing processing of "inverse quantization→inverse DCT" and processing of "DCT→quantization→variable-length coding".

Each of the first to sixth embodiments has been described in terms of the two-dimensional DCT. However, the present invention may be applicable in other two-dimensional orthogonal transforms.

The invention claimed is:

1. A two-dimensional orthogonal transform processor for continuously executing a series of mathematical operations, to find a set of two-dimensional orthogonal transform coefficients by performing a one-dimensional orthogonal transform of A(h) into B(h) and by performing another one-dimensional orthogonal transform of said transformed B(h) into C(h), where each of said A(h), said B(h), and said C(h) (h=1, 2, . . . , m) represents a two-dimensional data group of m data items, and each of said m data items is composed of n×n elements, said two-dimensional orthogonal transform processor comprising:

a memory in which said A(h), said B(h), and said C(h) are stored;

a single one-dimensional orthogonal transform processor which is pipelined in such a way as to process a one-dimensional vector of n elements; and an arithmetic and control unit for controlling said memory and said one-dimensional orthogonal transform processor; wherein:

(i) if $X(h)_i$ (i=1, 2, . . . , n) represents an operation on a row or column vector comprising the steps of:

transmitting an ith row or column vector of said A(h) from said memory to said one-dimensional orthogonal transform processor for product-of-matrices computations; and writing the product thus found to at an address of a corresponding vector of an ith row or column of said B(h) of said memory;

(ii) if $Y(h)_j$ (j=1, 2, . . . , n) represents an operation on a column or row vector comprising the steps of:

transmitting a jth column or row vector of said B(h) from said memory to said one-dimensional orthogonal transform processor for product-of-matrices computations; and writing the product thus found to at an address of a corresponding vector of a jth column or row of said C(h) of said memory; and (iii) if said operations $X(h)_i$ (i=1, 2, . . . , n ) are collectively called an operation X(h) and said operations $Y(h)_j$ (j=1, 2, . . . , n) are collectively called an operation Y(h);

said arithmetic and control unit controls said memory and said one-dimensional orthogonal transform processor in order that, immediately after said operation X(h) starts with respect to every h (h=1, 2, . . . , m), either an operation X(k) or Y(k) starts with respect to k that differs from said h, and said operation Y(h) then starts.

2. A two-dimensional orthogonal transform processor according to claim 1 wherein said arithmetic and control unit controls said memory and said one-dimensional orthogonal transform processor in order that said operation $X(h)_i$ starts in sequence with respect to every combination of said h and said i, and said operation $Y(h)_j$ then starts in sequence with respect to every combination of said h and said j.

3. A two-dimensional orthogonal transform processor according to claim 1 wherein:

said memory includes:

a first memory in which said A(h) and said C(h) are stored; and a second memory in which said B(h) is stored.

4. A two-dimensional orthogonal transform processor according to claim 3 wherein:

said arithmetic and control unit includes:

a first address generator which has a first mode and a second mode, wherein in said First mode said first address generator generates addresses in order that said row or column vectors of said A(h), stored in said first memory, are read in sequence, and in said second mode said first address generator generates addresses in order that said column or row vectors of said C(h), to be stored in said first memory, are written in sequence;

a second address generator which has a first mode and a second mode, wherein in said first mode said second address generator generates addresses in order that said row or column vectors of said B(h), to be stored in said second memory, are written in sequence, and in said second mode said second address generator generates addresses in order that said column or row vectors of said B(h), stored in said second memory, are read in sequence; and a control unit for controlling said first memory, said second memory, said one-dimensional orthogonal transform processor, said first address generator, and said second address generator; wherein said control unit exerts control in order that said first address generator is activated in said first mode, whereupon said row or column vectors of said A(h), stored in said first memory, are read in sequence, said row or column vectors thus read are transferred to said one-dimensional orthogonal transform processor for product-of-matrices computations; and said second address generator is activated in said first mode, whereupon the products thus Found are written in sequence to at addresses of corresponding row or column vectors of said B(h) of said second memory: and wherein said control unit then exerts control in order that said second address generator is activated in said second mode, whereupon said column or row vectors of said B(h), stored in said second memory, are read in sequence, said column or row vectors thus read are transferred to said one-dimensional orthogonal transform processor for product-of-matrices computations; and said first address generator is activated in said second mode, whereupon the products thus found are written in sequence to at addresses of corresponding column or row vectors of said C(h) of said first memory.

5. A two-dimensional orthogonal transform processor according to claim 4 wherein said control unit exerts control in order that the activation of said second address generator is delayed by the number of cycles proportional to pipeline delay of said one-dimensional orthogonal transform processor, with respect to the activation of said first address generator.

6. A two-dimensional orthogonal transform processor according to claim 1 wherein:

said memory includes:

a multiport memory capable of simultaneously performing read/write operations for storage of said A(h), said B(h), and said C(h).

7. A two-dimensional orthogonal transform processor according to claim 6 wherein:

said arithmetic and control unit includes:

a first address generator which has a first mode and a second mode, wherein in said first mode said first address generator generates addresses in order that said row or column vectors of said A(h), stored in said multiport memory, are read in sequence, and in said second mode said first address generator generates addresses in order that said column or row vectors of said B(h), stored in said multiport memory, are read in sequence;

a second address generator which has a first mode and a second mode, wherein in said first mode said second address generator generates addresses in order that said row or column vectors of said B(h), to be stored in said multiport memory, are written in sequence, and in said second mode said second address generator generates addresses in order that said column or row vectors of said C(h), to be stored in said multiport memory, are written in sequence: and a control unit for controlling said multiport memory, said one-dimensional orthogonal transform processor, said first address generator, and said second address generator: wherein said control unit exerts control in order that said First address generator is activated in said first mode, whereupon said row or column vectors of said A(h), stored in said multiport memory, are read in sequence, said row or column vectors thus read are transferred to said one-dimensional orthogonal transform processor for product-of-matrices computations; and said second address generator is activated in sald first mode, whereupon the products thus found are written in sequence to at addresses of corresponding row or column vectors of said B(h) of said multiport memory: and wherein said control unit then exerts control in order that said first address generator is activated in said second mode, whereupon said column or row vectors of said B(h), stored in said multiport memory, are read in sequence, said column or row vectors thus read are transferred to said one-dimensional orthogonal transform processor for product-of-matrices computations, and said second address generator is activated in said second mode, whereupon the products thus found are written in sequence to at addresses of corresponding column or row vectors of said C(h) of said multiport memory.

8. A two-dimensional orthogonal transform processor according to claim 7 wherein said control unit exerts control in order that the activation of said second address generator is delayed by the number of cycles proportional to pipeline delay of said one-dimensional orthogonal transform processor, with respect to the activation of said first address generator.

9. A two-dimensional orthogonal transform processor for continuously executing a series of mathematical operations, to find a set of two-dimensional orthogonal transform coefficients by performing a one-dimensional orthogonal transform of A(h) into B(h) and by performing another one-dimensional orthogonal transform of said transformed B(h) into C(h), where each of said A(h), said B(h), and said C(h) (h=1, 2, ..., m) represents a two-dimensional data group of m data items, and each of said m data items is composed of n×n elements, said two-dimensional orthogonal transform processor comprising:

a plurality of multiport memories in which said A(h), said B(h), and said C(h) are stored;

an interface for data communication to and from an assigned multiport memory of said plural multiport memories;

a two-dimensional orthogonal transform core for performing a one-dimensional orthogonal transform of said A(h) stored in an assigned multiport memory of said plural multiport memories into said B(h) and for performing another one-dimensional orthogonal transform of said transformed B(h) into said C(h), in order to store said two-dimensional orthogonal transform coefficients in said assigned multiport memory; and a switch unit for performing toggle switching to change the assignment of said plural multiport memories with respect to said interface and said two-dimensional orthogonal transform core so that said A(h) provided via said interface is transformed by said two-dimensional orthogonal transform core into said C(h);

said two-dimensional orthogonal transform core including:

a single one-dimensional orthogonal transform processor which is pipelined in such a way as to process a one-dimensional vector of n elements;

a first address generator which has a first mode and a second mode, wherein in said first mode said first address generator generates addresses in order that said row or column vectors of said A(h), stored in said assigned multiport memory, are read in sequence, and in said second mode said first address generator generates addresses in order that said column or row vectors of said B(h), stored in said assigned multiport memory, are read in sequence;

a second address generator which has a first mode and a second mode, wherein in said first mode said second address generator generates addresses in order that said row or column vectors of said B(h), to be stored in said assigned multiport memory, are written in sequence, and in said second mode said second address generator generates addresses in order that said column or row vectors of said C(h), to be stored in said assigned multiport memory, are written in sequence; and a control unit for controlling said assigned multiport memory, said one-dimensional orthogonal transform processor, said first address generator, and said second address generator; wherein said control unit exerts control in order that said first address generator is activated in said first mode, whereupon said row or column vectors of said A(h), stored in said assigned multiport memory, are read in sequence, said row or column vectors thus read are transferred to said one-dimensional orthogonal transform processor for product-of-matrices computations; and said second address generator is activated in said first mode, whereupon the products thus found are written in sequence to at addresses of corresponding row or column vectors of said B(h) of said assigned multiport memory; and wherein said control unit then exerts control in order that said first address generator is activated in said second mode, whereupon said column or row vectors of said B(h), stored in said assigned multiport memory, are read in sequence, said column or row vectors thus read are transferred to said one-dimensional orthogonal transform processor for product-of-matrices computations, and said second address generator is activated in said second mode, whereupon the products thus found are written in sequence to at addresses of corresponding column or row vectors of said C(h) of said assigned multiport memory.

10. A two-dimensional orthogonal transform processor for continuously executing a series of mathematical operations, to find a set of two-dimensional orthogonal transform coefficients by performing a one-dimensional orthogonal transform of A(h) into B(h) and by performing another one-dimensional orthogonal transform of said transformed B(h) into C(h), where each of said A(h), said B(h), and said C(h) (h=1, 2, . . . , m) represents a two-dimensional data group of m data items, and each of said m data items is composed of n×n elements, said two-dimensional orthogonal transform processor comprising:

- a plurality of single-port memories in which said A(h) and said C(h) are stored;
- an interface for data communication to and from an assigned single-port memory of said plural single-port memories;
- a dedicated single-port memory in which only said B(h) is stored;
- a two-dimensional orthogonal transform core for performing a one-dimensional orthogonal transform of said A(h) stored in an assigned single-port memory of said plural single-port memories into said B(h) within said dedicated single-port memory and for performing another one-dimensional orthogonal transform of said transformed B(h) into said C(h), in order to store said two-dimensional orthogonal transform coefficients in said assigned single-port memory; and
- a switch unit for performing toggle switching to change the assignment of said plural single-port memories with respect to said interface and said two-dimensional orthogonal transform core so that said A(h) provided via said interface is transformed by said two-dimensional orthogonal transform core into said C(h);

said two-dimensional orthogonal transform core including:

- a single one-dimensional orthogonal transform processor which is pipelined in such a way as to process a one-dimensional vector of n elements;
- a first address generator which has a first mode and a second mode, wherein in said first mode said first address generator generates addresses in order that said row or column vectors of said A(h), stored in said assigned single-port memory, are read in sequence, and in said second mode said first address generator generates addresses in order that said column or row vectors of said C(h), to be stored in said assigned single-port memory, are written in sequence;
- a second address generator which has a first mode and a second mode, wherein in said first mode said second address generator generates addresses in order that said row or column vectors of said B(h), to be stored in said dedicated single-port memory, are written in sequence, and in said second mode said second address generator generates addresses in order that said column or row vectors of said B(h), stored in said dedicated single-port memory, are read in sequence; and
- a control unit for controlling said assigned single-port memory, said dedicated single-port memory, said one-dimensional orthogonal transform processor, said first address generator, and said second address generator; wherein said control unit exerts control in order that said first address generator is activated in said first mode, whereupon said row or column vectors of said A(h), stored in said assigned single-port memory, are read in sequence, said row or column vectors thus read are transferred to said one-dimensional orthogonal transform processor for product-of-matrices computations; and said second address generator is activated in said first mode, whereupon the products thus found are written in sequence to at addresses of corresponding row or column vectors of said B(h) of said dedicated single-port memory; and wherein said control unit then exerts control in order that said second address generator is activated in said second mode, whereupon said column or row vectors of said B(h), stored in said dedicated single-port memory, are read in sequence, said column or row vectors thus read are transferred to said one-dimensional orthogonal transform processor for product-of-matrices computations, and said first address generator is activated in said second mode, whereupon the products thus found are written in sequence to at addresses of corresponding column or row vectors of said C(h) of said assigned single-port memory.

* * * * *

UNITED STATES PATENT AND TRADEMARK OFFICE
CERTIFICATE OF CORRECTION

PATENT NO. : 5,583,803
DATED : December 10, 1996
INVENTOR(S) : Yoshifumi Matsumoto, et al.

It is certified that error appears in the above-indentified patent and that said Letters Patent is hereby corrected as shown below:

Col. 16, line 9, delete first instance of "First", and insert -- first --; and
line 38, delete "Found", and insert --found--; and
line 40, delete ":", and insert --;--.

Col. 17, line 24, delete first instance of "First", and insert --first--.

Signed and Sealed this

Seventeenth Day of March, 1998

Attest:

BRUCE LEHMAN

Attesting Officer

Commissioner of Patents and Trademarks